United States Patent
Crum

(10) Patent No.: US 11,391,654 B2
(45) Date of Patent: Jul. 19, 2022

(54) CONTACTLESS MIXING USING MODULATED AIR JETS

(71) Applicant: Ventana Medical Systems, Inc., Tucson, AZ (US)

(72) Inventor: Nathaniel Crum, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 16/877,886

(22) Filed: May 19, 2020

(65) Prior Publication Data

US 2020/0278278 A1 Sep. 3, 2020

Related U.S. Application Data

(63) Continuation of application No. PCT/EP2018/081669, filed on Nov. 19, 2018.

(60) Provisional application No. 62/589,234, filed on Nov. 21, 2017.

(51) Int. Cl.
| | | |
|---|---|---|
| *G01N 1/00* | (2006.01) | |
| *G01N 1/31* | (2006.01) | |
| *G01N 35/00* | (2006.01) | |
| *B01F 33/40* | (2022.01) | |
| *B01F 101/23* | (2022.01) | |

(52) U.S. Cl.
CPC ............ *G01N 1/312* (2013.01); *B01F 33/407* (2022.01); *G01N 35/00029* (2013.01); *B01F 2101/23* (2022.01); *G01N 2001/317* (2013.01); *G01N 2035/00138* (2013.01); *G01N 2035/00544* (2013.01)

(58) Field of Classification Search
None
See application file for complete search history.

(56) References Cited

U.S. PATENT DOCUMENTS

| | | | |
|---|---|---|---|
| 5,595,707 A * | 1/1997 | Copeland ............. | B01F 5/0057 422/63 |
| 2003/0022176 A1 | 1/2003 | Schremp et al. | |
| 2003/0032191 A1 | 2/2003 | Hilson et al. | |
| 2008/0113450 A1 | 5/2008 | Mann et al. | |

OTHER PUBLICATIONS

International Search Report and Written Opinion, dated Feb. 13, 2019, in corresponding PCT/EP2018/081669 filed Nov. 19, 2018], pp. 1-17.

* cited by examiner

*Primary Examiner* — Jyoti Nagpaul
(74) *Attorney, Agent, or Firm* — Charney IP Law LLC; Thomas M. Finetti

(57) ABSTRACT

Disclosed is a device for contactlessly mixing fluid present on the upper surface of the slide, where the device comprises a first nozzle array and a second nozzle array, the first nozzle array adapted to impart a bulk fluid flow to the fluid present on the upper surface of the slide, and the second nozzle array adapted to impart at least a first regional fluid flow to at least a portion of the fluid present on the upper surface of the slide.

14 Claims, 13 Drawing Sheets

Section A-A

Section B-B

Section C-C

CONTACTLESS MIXING USING MODULATED AIR JETS

CROSS-REFERENCE TO RELATED APPLICATIONS

The present application is a continuation of PCT Application No. PCT/EP2018/081669 filed on Nov. 19, 2018, which application claims the benefit of the filing date of U.S. Provisional Patent Application No. 62/589,234 filed on Nov. 21, 2017, the disclosure of which is hereby incorporated by reference herein in its entirety.

BACKGROUND OF THE DISCLOSURE

Many tissues do not retain enough color after processing to make their components visible under a bright-field microscope. Accordingly, it is common practice to add color and contrast to tissue components by staining the tissue with various reagents. In the past, the steps of staining a tissue sample for histological or cytological analysis were performed manually, a process that is inherently inconsistent. Inconsistent staining makes it difficult for a pathologist or other medical personnel to interpret slides and to make comparisons between different samples. Thus, a number of devices and methods have been described that serve to automate the staining process and reduce staining inconsistency.

Devices for automated staining, especially for high volume staining with traditional reagents such as hematoxylin and eosin (H&E), are primarily of a "dip and dunk" type, where racks of slides are automatically lowered into and removed from a series of reagent baths. For example, U.S. Pat. No. 4,911,098 to Tabata describes an automated staining apparatus, where microscope slides holding tissue specimens are dipped sequentially into a large number of chemical solution containers. The slides are mounted vertically in a slide holder basket and a clamp that engages and disengages the basket is used to move the slides from solution to solution. The clamp can include a mechanism to tilt the basket, which aids in removing excess solution before the basket is submerged in the next solution. Additional automated staining devices of the "dip and dunk" type are described in U.S. Pat. No. 5,573,727 to Keefe, U.S. Pat. No. 6,080,363 to Takahasi et al., U.S. Pat. No. 6,436,348 to Ljungmann et al. and U.S. Patent Application Publication No. 2001/0019703, naming Thiem et al. as inventors.

Another type of automatic staining apparatus delivers fresh reagents directly to individual slides. For example, U.S. Pat. No. 6,387,326 to Edwards et al. describes an apparatus for staining slides where slides are expelled one at a time from a slide storage device and individually treated at various staining stations as they move along a conveyor belt transport apparatus. Additional devices for automatically staining individual slides are described in U.S. Pat. No. 6,180,061 to Bogen et al., PCT Publication WO 03/045560, naming Tseung et al. as inventors, and U.S. Patent Application Publication No. U.S. 2004/0052685 naming Richards et al. as inventors.

Efficient mixing of fluids is an important step in many industrial, chemical, and pharmaceutical methods, as well as in biotechnological applications. The mixing at small scales is often a difficult task. In some embodiments, molecular diffusion becomes the main mixing mechanism, which makes the overall process slow. Integration of active mixers is often difficult, increases the costs of any such device, and introduces cross-contamination between samples.

BRIEF SUMMARY OF THE DISCLOSURE

Disclosed herein are systems and methods for the contactless dispersion, replenishment, and/or mixing (collectively referred to as "mixing" herein) of one or more fluids on a substrate (e.g. a microscope slide). Applicant has discovered that the use of a plurality of streams of gas directed to a fluid (e.g. a puddle of fluid) present on the surface of a substrate (e.g. a planar support surface) provides fluid movement and direction to predetermined areas of the fluid, thus enabling mixing, distribution, and/or replenishment of the fluid or components within the fluid. Applicant has also surprisingly discovered that the introduction of such directed streams (such as separate or discrete streams) of gas achieves bulk mixing of fluid as opposed to mere agitation or local mixing. Indeed, Applicant has discovered that the contactless mixers of the present disclosure enable improved mixing as compared with merely stirring fluids on a substrate with an induced vortex (e.g. mixing with the contactless mixers of the present disclosure allows quicker and more thorough mixing). Moreover, the contactless mixers of the present disclosure allow fluid movement in multiple locations across the slide such that bubbles, if formed, could be displaced and/or eliminated. In contrast, mere vortex mixing may cause bubbles to move to the center of a fluid.

Applicant has also discovered that mixing fluids according to the methods described herein (i) reduces the risk of staining artifacts; (ii) allows for a uniform reagent concentration across the cells and/or tissue during staining, e.g. to mitigate the formation of lightly staining areas e.g. light spots) or the formation of darkly staining areas (e.g. dark spots); (iii) enables increased mixing frequency; (iv) increases mixing efficacy; and/or (v) reduces or eliminates the presence of bubbles in the fluids. It is also believed that the use of the devices and methods disclosed herein may permit the use of lower concentrations of detection probes (e.g. antibodies) or other reagents in any histological or cytological staining procedure. In addition, the use of the devices and methods allows for low manufacturing and maintenance costs, reduced process times, and/or mitigation of contamination. These and other benefits will be described further herein.

In one aspect of the present disclosure is a device which enables contactless mixing of a fluid on a substrate, the device configured to direct a plurality of streams of gas to the fluid and/or to the surface of the substrate such that at least two discrete fluid motions are imparted to portions of the fluid at different times, the two discrete fluid motions enabling cross-mixing. In some embodiments, the device is configured such that the gas streams mitigate loss of fluid from the substrate or splashing of the fluid from the substrate to an adjacent substrate, while adequately mixing the fluid present on the substrate surface.

In another aspect of the present disclosure is an automated slide processing apparatus comprising at least one contactless mixer for mixing fluid present on the upper surface of the slide, where the contactless mixer includes a first nozzle set and a second nozzle set, where the first nozzle set is configured to impart a first motion to a first portion of fluid present on the upper surface of the slide, and the second nozzle is set configured to impart a second motion to at least a second portion of the fluid present on the upper surface of the slide. In some embodiments, the second motion induces cross-mixing of the fluid. In some embodiments, the first and second motions are opposite motions. In some embodiments, the second nozzle set imparts a second motion and a third motion, wherein the second and third motions may be the same or different, but where at least one of the second or third motions is opposite the first motion. In some embodiments, the gas streams enables the fluid, or any portion thereof, to move in a substantially circular path.

In some embodiments, the first set of nozzles are operated independently and at different times from the second set of nozzles, i.e. the first set of nozzles are operated exclusively from the second set of nozzles. In this way, the first nozzle set may impart a first motion at least during the operation of the first nozzle set; and wherein the second nozzle set may impart at least a second motion at least during the operation of the second nozzle set. The skilled artisan will appreciate that the first nozzle set may comprise a plurality of nozzles, and each of the plurality of nozzles of the first nozzle set are operated concurrently to effectuate the first fluid motion. By way of example, a first nozzle set may comprise first and second nozzles directing gas streams towards one area of the fluid, and third and fourth nozzles concurrently directing gas streams toward another area of the fluid, where the first and second nozzles may direct gas in a first direction and whereby the third and fourth nozzles may direct gas in a second, opposite direction. Of course, the second nozzle may be similarly configured for operation in a like manner, but to effectuate at least the second motion. In some embodiments, the automated slide processing apparatus further includes a second contactless mixer, such as one having one or more discrete nozzle sets, each discrete nozzle set capable of independent operation.

In some embodiments, the first portion is a majority of the fluid present on the slide. In some embodiments, the first motion is applied to the entirety of the fluid. In some embodiments, the first motion is one of a clockwise or counter-clockwise stirring. In yet other embodiments, the first motion is imparted to at least 60% of the fluid. In even further embodiments, the first motion is imparted to at least 70% of the fluid. In yet further embodiments, the first motion is imparted to at least 80% of the fluid.

In some embodiments, second motion is imparted to at least two discrete portions of the fluid present on the upper surface of the slide. In some embodiments, the second motion is imparted to at least three discrete portions of the fluid present on the upper surface of the slide. In some embodiments, the second motion is imparted to a center portion of the fluid (e.g. a center third of the entirety of the fluid). In some embodiments, the second nozzle set is further adapted to impart a third motion to two end portions of fluid (e.g. the first and last thirds of the entirety of the fluid), where the two end portions of fluid are each adjacent to the center portion, and wherein the third motion is opposite the second motion. In some embodiments, the first motion is a counter-clockwise stirring, the second motion is a clockwise stirring, and the third motion is a counter-clockwise stirring.

In some embodiments, the second nozzle set is configured such that the second motion is imparted to at least two different portions of the fluid, e.g. non-adjacent portions of the fluid. In some embodiments, the second nozzle set is further adapted to impart a third motion to a center portion of the fluid. In some embodiments, the first motion is a counter-clockwise motion, the second motion is a clockwise motion, and the third motion is a counter-clockwise motion; and wherein the second motion is imparted to two end portions of fluid located on either side of the center portion.

In some embodiments, the at least one contactless mixer is positioned above the upper surface of the slide. In some embodiments, the at least one contactless mixer is positioned between 0.3 inches (7.62 mm) to about 1.5 inches (38.1 mm) above the slide. In some embodiments, the at least one contactless mixer is positioned substantially parallel to the upper surface of the slide. In some embodiments, the at least one contactless mixer body is offset at a predetermined angle relative to the upper surface of the slide (e.g. offset at an angle between about 1 degree to about 20 degrees).

In some embodiments, the first and second nozzle sets are configured to direct streams of gas to predetermined positions on the upper surface of the slide. In some embodiments, the first and second nozzle sets are configured to direct streams of gas to predetermined positions on the upper surface of the slide at predetermined angles of incidence relative to the slide surface. In some embodiments, an angle of incidence (e.g. the angle from a line perpendicular to a surface) of a gas stream relative to the upper surface of the slide is between about 15 degrees and about 90 degrees. In some embodiments, the gas streams may be directed to positions between a fluid on the slide and an edge of the upper surface of the slide.

In some embodiments, the first nozzle set includes between 2 and 6 nozzles. In some embodiments, the first nozzle set includes between 4 and 6 nozzles. In some embodiments, the nozzles of the first nozzle set are grouped in two parallel rows along the longitudinal axis of the contactless mixer. In some embodiments, each nozzle in the first nozzle set independently has a specific slant angle and offset angle, as those terms are defined herein. In some embodiments, the second nozzle set includes between 2 and 4 nozzles. In some embodiments, the nozzles of the second nozzle set are grouped in two substantially parallel rows along the longitudinal axis of the contactless mixer. In some embodiments, each nozzle in the second nozzle set independently have a specific slant angle and offset angle.

In some embodiments, the automated slide processing apparatus is a staining apparatus. In some embodiments, the automated slide processing apparatus further includes a control system, the control system adapted to independently operate (e.g. pulse at predetermined intervals and/or at predetermined frequencies) the first and second nozzle sets to impart the first and second motions, and any additional motions if the contactless mixer is so configured. In some embodiments, the automated slide processing apparatus further includes a third nozzle set to impart yet an additional direction of motion to the fluid present on the upper surface of the slide.

In another aspect of the present disclosure is a method of operating a contactless mixer, the contactless mixer including a first nozzle set and a second nozzle set, the first nozzle set adapted to impart a first motion to the fluid present on the upper surface of the slide, and the second nozzle set adapted to impart a second motion to at least a portion of the fluid present on the upper surface of the slide, wherein the method includes operating the first nozzle set for a first time period, and then subsequently operating the second nozzle set for a second time period, provided that the first and second nozzle arrays are not operated concurrently. In some embodiments, the first and second nozzle sets are both operated at least once. In some embodiments, the first and second nozzle sets are both operated at least twice. In some embodiments, the first and second nozzle sets are communicatively coupled to a control system having one or more sensors, the sensors adapted to determine a degree of mixing during or following operation of the first and/or second nozzle sets.

In another aspect of the present disclosure is an automated slide processing apparatus comprising: (i) at least one fluid dispenser configured to dispense a fluid onto an upper surface of a specimen-bearing slide; and (ii) a contactless mixer for mixing fluid present on the upper surface of the slide, where the contactless mixer includes a first nozzle array and a second nozzle array, the first nozzle array adapted to impart a bulk fluid flow to the fluid present on the upper surface of the slide, and the second nozzle array adapted to impart at least a first regional fluid flow to at least a portion of the fluid present on the upper surface of the slide. In some embodiments, the first regional fluid flow induces a cross-mixing within the fluid. In some embodiments, the automated slide processing apparatus is a staining apparatus, and wherein the fluid present on the upper surface of the slides includes a reagent, non-limiting examples of which include a staining reagent, a counterstaining reagent, or a wash reagent. Other reagents and or fluids which may be present on the surface of the slide are known to those of ordinary skill in the art.

In some embodiments, the bulk fluid flow is one of a clockwise or counter-clockwise motion, e.g. a stirring or other rotational movement. In some embodiments, the first regional fluid flow is the other of a clockwise or counter-clockwise motion. In some embodiments, the first regional fluid flow is imparted to a center portion of the fluid present on the upper surface of the slide. In some embodiments, the first regional fluid flow is imparted to a center portion of the fluid present on the upper surface of the slide, the center portion representing about a third of the fluid present on the upper surface of the slide. The skilled artisan will appreciate that the first regional fluid flow may imparted in any portion of the fluid on the slide, provided that the first regional fluid flow, along with any additional imparted regional fluid flows, enables a cross-mixing.

In some embodiments, the second nozzle array is further adapted to impart a second regional fluid flow and a third regional fluid flow, the second and third regional fluid flows occurring at different two end portions of the fluid on the slide, the two end portions each being adjacent to the center portion, and wherein the second and third regional fluid flows are opposite the first regional fluid flow. In some embodiments, the second regional fluid flow and the third regional fluid flow are imparted from the second nozzle array substantially simultaneously.

In some embodiments, wherein the automated slide processing apparatus is a staining apparatus, and wherein the fluid present on the upper surface of the slide includes, but is not limited to, a staining reagent, a counterstaining reagent, or a wash reagent.

In another aspect of the present disclosure is a method of operating a contactless mixer, the contactless mixer including a first nozzle array and a second nozzle array, the first nozzle array adapted to impart a bulk fluid flow to a fluid (or portion thereof) present on the upper surface of the slide, and the second nozzle array adapted to impart at least a first regional fluid flow to at least a portion of a fluid present on the upper surface of the slide, wherein the method includes operating the first nozzle array for a first time period (e.g. to induce a bulk fluid flow for at least a portion of the time in which the first nozzle array is operated), and then operating the second nozzle array for a second time period (e.g. to induce at least one regional flow for at least a portion of the time in which the second nozzle array is operated), provided that the first and second nozzle arrays are not operated concurrently. In some embodiments, one of the first or second time periods is a predetermined time period. In some embodiments, one of the first or second time periods is determined in real-time using a feedback mechanism configured to interpret a level or degree of mixing achieved during operation of the first and/or second nozzle arrays. In some embodiments, the feedback mechanism includes one or more sensors communicatively coupled to a control system. In some embodiments, the first and second nozzle arrays are operated sequentially at least twice. In some embodiments, operation of the first nozzle array is always followed by operation of the second nozzle array, even if the operation of the second nozzle array is for a fraction of the time period in which the first nozzle array was operated. In other embodiments, the operation of the contactless mixer may include: (i) operating the first nozzle array; (ii) subsequently operating the second nozzle array; and (iii) subsequently operating the first nozzle array. In some embodiments, the second nozzle array is configured such that at least second and third regional motions are induced, and wherein the second and third regional fluid motions are induced during operation of the second nozzle array, and both the second and third regional fluid motions occur at substantially the same time.

In another aspect of the present disclosure is an automated slide processing apparatus comprising: (a) at least one fluid dispenser configured to dispense a fluid onto an upper surface of a specimen-bearing slide; and (ii) a contactless mixer for distributing fluid present on the upper surface of the slide, where the contactless mixer includes a first nozzle array in fluidic communication with a first plenum, wherein the first nozzle array includes a first set of primary nozzles directing a gas stream in a first direction and a second set of primary nozzles directing a gas stream in a second direction; and a second nozzle array in fluid communication with a second plenum. In some embodiments, the second nozzle array includes a first set of secondary nozzles directing a gas stream in third direction and a second set of secondary nozzles directing a gas stream in a fourth direction. In some embodiments, the second nozzle array further includes additional sets of secondary nozzles, each additional set of nozzles adapted to direct a gas stream in another direction.

In some embodiments, the first and second directions are opposite each other. In some embodiments, the gas streams emanating from the first and second sets of primary nozzles are directed substantially along a periphery of the fluid present on the upper surface of the slide, and at any angle of incidence relative to the upper surface of the slide (or fluid positioned thereon). In some embodiments, the gas streams emanating from the first and second sets of primary nozzles are directed to a portion of the slide adjacent to fluid, and at any angle of incidence relative to the upper surface of the slide (or fluid positioned thereon).

In some embodiments, the gas stream emanating from the first set of primary nozzles is directed substantially along a first longitudinal axis of the slide; and wherein the gas stream emanating from the second set of primary nozzles is directed substantially along a second longitudinal axis of the slide (either to the fluid, to an area of the slide not containing fluid, or to both). In some embodiments, the gas streams from the first and second primary nozzles form an angle of incidence with the surface of the slide ranging from between about 20 degrees to about 80 degrees. In some embodiments, the gas streams emanating from the first and second sets of primary nozzles are independently offset by up to +/−15 degrees relative to a longitudinal axis of the slide.

In some embodiments, the first nozzle array imparts a bulk fluid motion to the fluid present on the upper surface of the slide. In some embodiments, each nozzle in the first set of secondary nozzles directs a gas stream to a different position on the upper surface of the slide; and wherein each nozzle in the second set of secondary nozzles directs a gas stream to yet other different positions on the upper surface of the slide. In some embodiments, the second nozzle array establishes at least two regional fluid flows. In some embodiments, the second nozzle array establishes at least three regional fluid flows.

In another aspect of the present disclosure is a method of processing a specimen-bearing slide comprising: (i) depositing a first fluid on the specimen-bearing slide; and (ii) uniformly distributing the deposited first fluid on the specimen-bearing slide, wherein the deposited first fluid is distributed by introducing a first set of gas streams to the deposited first fluid to effectuate a first fluid motion to a first portion of the deposited first fluid for a predetermined first period of time, and introducing a second set of gas streams to the deposited first fluid to effectuate at least a second fluid motion to at least a second portion of the deposited first fluid for a predetermined second period of time. In some embodiments, the first and second motions impart a cross-mixing. In some embodiments, the first fluid motion is imparted with a first nozzle array; and wherein the at least the second fluid motion is imparted with a second nozzle array. In some embodiments, the first portion is a majority of the first fluid on the slide, and wherein the first set of gas streams induce a bulk fluid motion. In some embodiments, the second portion is a center portion of the first fluid on the slide (e.g. a center portion of a puddle of fluid). In some embodiments, the at least the second motion is a regional fluid motion imparted to a center portion of the fluid on the slide. In some embodiments, the second motion induces cross-mixing. In some embodiments, the first fluid is a reagent. In some embodiments, the first fluid is a mixture having multiple components.

In another aspect of the present disclosure is a method of processing a specimen-bearing slide comprising: (i) depositing a first reagent on the specimen-bearing slide; and (ii) uniformly distributing the deposited first reagent on the specimen-bearing slide, wherein the deposited first reagent is distributed by introducing a first set of pulsed gas jets to the deposited first reagent to effectuate a first fluid motion to a first portion of the deposited first reagent for a predetermined first period of time, and introducing a second set of pulsed gas jets to the deposited first reagent to effectuate at least a second fluid motion to at least a second portion of the deposited first reagent for a predetermined second period of time. In some embodiments, the first portion of the deposited first reagent includes a majority of the deposited first reagent. In some embodiments, the first fluid flow is a bulk fluid flow. In some embodiments, the at least the second portion of the deposited first reagent is a center portion of the deposited first reagent. In some embodiments, the first and second motions are in the same direction. In some embodiments, the first and second motions are in opposite directions. In some embodiments, the first predetermined time period ranges from about 2 seconds to about 10 seconds. In some embodiments, the second predetermined time period ranges from about 2 seconds to about 10 seconds. In some embodiments, a first set of gas jets and a second set of gas jets are sequentially operated at least 2 times each. In some embodiments, a first set of gas jets and a second set of gas jets are sequentially operated at least 4 times each. In some embodiments, pulsing with either first or second sets of gas jets occurs at a frequency ranging from about 4 Hz to about 20 Hz. In some embodiments, additional reagent is dispensed to the upper surface of the slide and mixing with the gas jets is performed again to mix the second reagent.

In another aspect of the present disclosure, is a contactless mixer having a first nozzle array and a second nozzle array, the first nozzle array adapted to impart one or more gas streams to the fluid and/or the substrate such that substantially the entirety of a fluid on a substrate is moved along a first substantially circular path (first "swirl" motion); and wherein the second nozzle array is adapted to impart one or more gas streams to the fluid and/or the substrate such that three different portions of the fluid on the substrate are moved along second, third, and forth substantially circular paths (first, second, and third "swirl" motions). In some embodiments, the second nozzle array is adapted to provide for a cross-mixing of the fluid.

DETAILED DESCRIPTION

Definitions

Figure 1A:
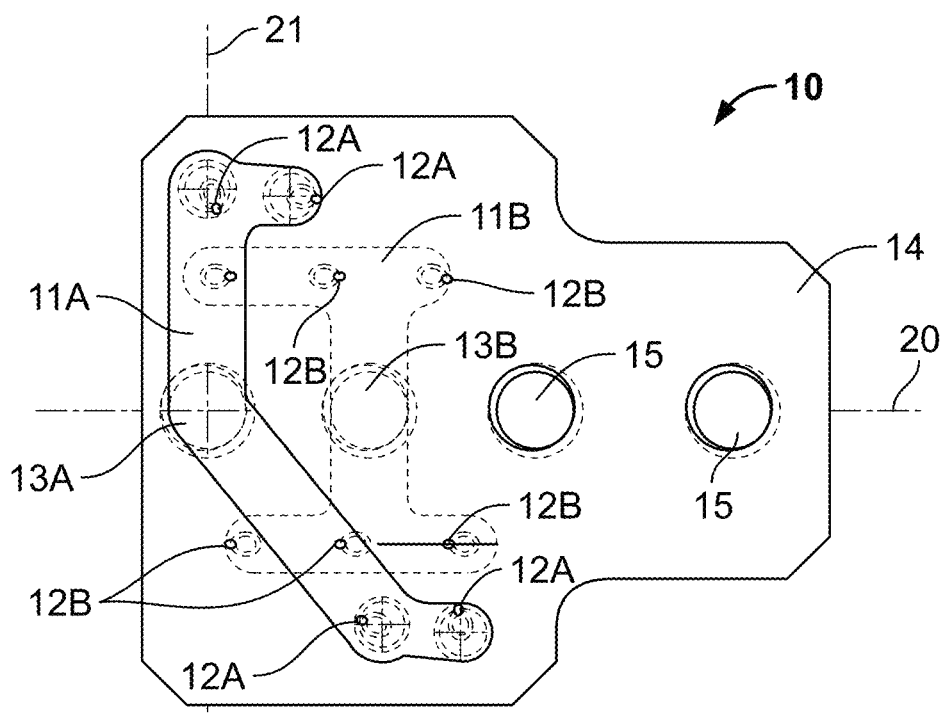
FIG. 1A illustrates a bottom view of a contactless mixer having first and second nozzle arrays in accordance with some embodiments.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, the term "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the phrase "bulk fluid flow" refers to a motion imparted to a majority of a fluid on a substrate. Bulk fluid flow may be along a circular path. Bulk fluid flow may be in a specific direction, e.g. clockwise or counter-clockwise.

As used herein, the term "fluid" refers to any liquid, including water, solvents, solutions (e.g. buffer solutions), etc. The term "fluids" also refers to any mixtures, colloids, suspensions, etc. The term "fluids" also encompasses reagents, stains, and other specimen processing agents (e.g. glues, fixatives, etc.) which may be applied to a microscope slide and/or specimen. The fluids may be aqueous or non-aqueous. Further examples include solutions or suspensions of antibodies, solutions or suspensions of nucleic acid probes, and solutions or suspensions of dye or stain molecules (e.g., H&E staining solutions, Pap staining solutions, etc.). Still further examples of fluids include solvents and/or solutions for deparaffinizing paraffin-embedded biological specimens, aqueous detergent solutions, and hydrocarbons (e.g., alkanes, isoalkanes and aromatic compounds such as xylene). Still further examples of fluids include solvents (and mixtures thereof) used to dehydrate or rehydrate biological specimens.

As used herein, the terms "nozzle array", "nozzle set" and "set of nozzles" each refer to a series of nozzles which together are adapted to impart a fluid flow, such as a bulk fluid flow or a regional fluid flow. In some embodiments, a "nozzle array" may itself include multiple "sets of nozzles," or at least two series of nozzles.

As used herein, the term "plurality" refers to two or more, for example, 3 or more, 4 or more, 5 or more, etc.

As used herein, the terms "reagent" refers to any liquid or liquid composition used in a specimen processing operation that involves adding liquid or liquid composition to a slide. Examples of reagents and processing liquids include solutions, emulsions, suspensions, and solvents (either pure or mixtures thereof). These and other examples can be aqueous or non-aqueous. Further examples include solutions or suspensions of specific-binding entities, antibodies, solutions or suspensions of nucleic acid probes, and solutions or suspensions of dye or stain molecules (e.g., H&E staining solutions, Pap staining solutions, etc.). Still further examples include solvents and/or solutions for deparaffinizing paraffin-embedded biological specimens, aqueous detergent solutions, and hydrocarbons (e.g., alkanes, isoalkanes and aromatic compounds such as xylene).

As used herein, the phrase "regional fluid flow" refers to a flow of fluid in a particular portion or area of a fluid on a substrate, but less than a majority of the fluid on the substrate. A regional fluid flow may be in a specific direction, e.g. clockwise or counter-clockwise. The skilled artisan will appreciate that any fluid present on the substrate may be divided into several areas, regions, or portions, a regional fluid flow may be imparted to any of these areas, regions, or portions.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

As used herein, the terms "stain," "staining," or the like as used herein generally refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures and organisms not only with bright-field microscopes, but also with other viewing tools, such as phase contrast microscopes, electron microscopes, and fluorescence microscopes. Some staining performed by the system 2 can be used to visualize an outline of a cell. Other staining performed by the system 2 may rely on certain cell components (such as molecules or structures) being stained without or with relatively little staining other cell components. Examples of types of staining methods performed by the system 2 include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH).

As used herein, the term "substantially" means the qualitative condition of exhibiting total or near-total extent or degree of a characteristic or property of interest. In some embodiments, "substantially" means within about 20%. In some embodiments, "substantially" means within about 15%. In some embodiments, "substantially" means within about 10%. In some embodiments, "substantially" means within about 5%.

Devices and Systems

One aspect of the present disclosure is a contactless mixer device configured to introduce gas, such as pulses of a gas, to a fluid on the surface of a substrate, e.g. a specimen-bearing microscope slide, to effectuate mixing of one or more components within the fluid (e.g. a puddle of fluid on the upper surface of the microscope slide). In some embodiments, the substrate or microscope slide includes a biological sample comprising cells and/or tissue, and mixing by means of the pulses of gas occurs without damaging the cells and/or tissue within the sample and/or with minimal waste, i.e. the pulses of gas operate so as to minimize the amount of fluids directed off the surface of the substrate.

In some embodiments, the gas streams or pulses of gas are generated with a contactless mixer device, the contactless mixer including a plurality of nozzles adapted to direct gas streams or pulses of gas to different areas (e.g. predetermined areas, predetermined positions at predetermined angles) on the surface of the substrate. In doing so, the directed gas streams enable any fluid present on the slide to vibrate, move, and/or stir. As will be made described further herein, the plurality of nozzles are fluidically connected to a plenum, the plenum being in further communication with an inlet. The contactless mixer may include one or more plenums, each plenum in fluidic communication with a different inlet, and each plenum further in communication with different sets of nozzles.

Figure 1B:
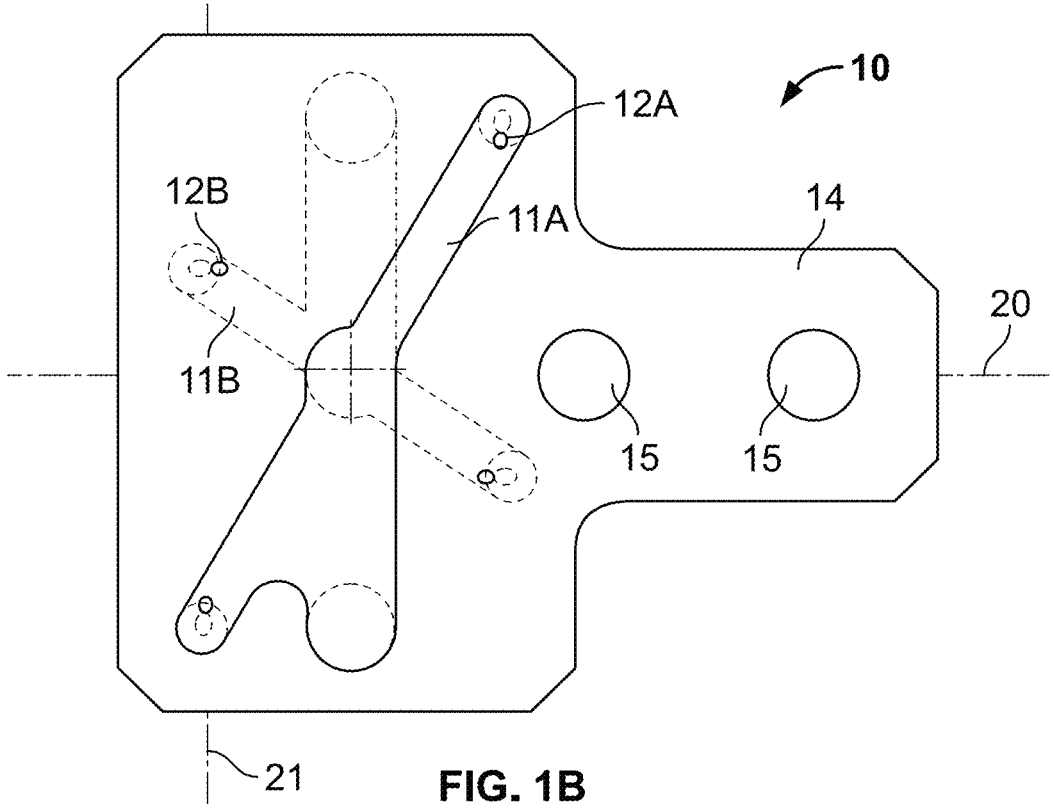
FIG. 1B illustrates a bottom view of an alternative contactless mixer having first and second nozzle arrays in accordance with some embodiments.

With reference to FIGS. 1A-1B and 2A-2B, the contactless mixer 10 may include one or more plenums 11A and 11B, each of the one or more plenums having plurality of nozzles 12A or 12B in fluidic communication therewith. In some embodiments, the one or more plenums 11A and 11B are each independently in fluidic communication with an inlet 13A and 13B, respectively. In this way, a gas stream entering through the inlet 13A or 13B may flow into the plenum 11A or 11B, respectively, where it is distributed to each of the individual gas nozzles 12A or 12B and expelled as a stream or jet of gas. While FIGS. 1A and 1B illustrate that the contactless mixer may comprise two sets of nozzles, each set of nozzles in fluidic communication with a plenum 11A or 11B, which is in turn in communication with an inlet 13A or 13B, the contactless mixer may include only a single plenum, or may comprise more than two plenums.

Figure 2A:
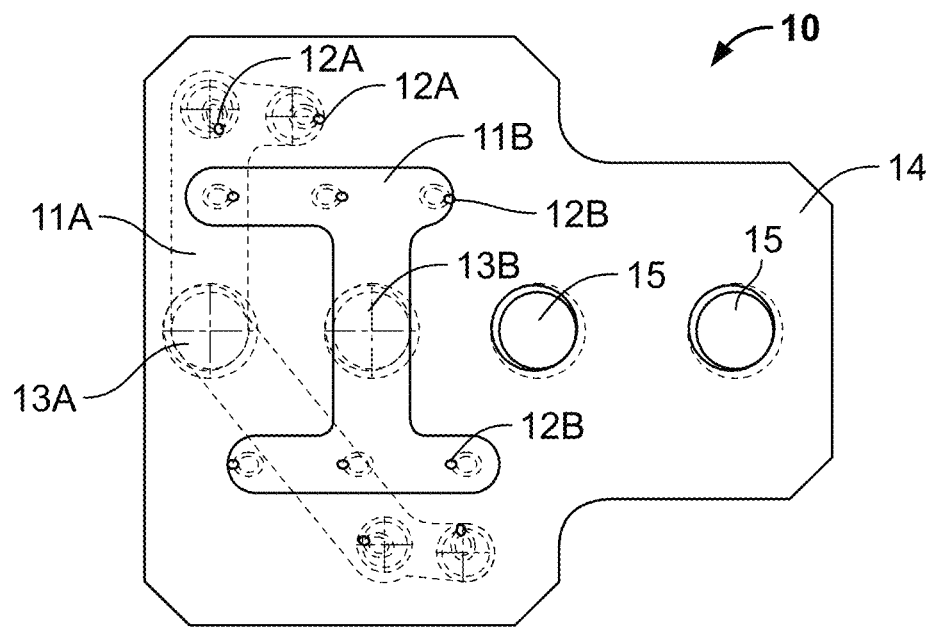
FIG. 2A illustrates a bottom view of a contactless mixer having first and second nozzle arrays in accordance with some embodiments.
Figure 2B:
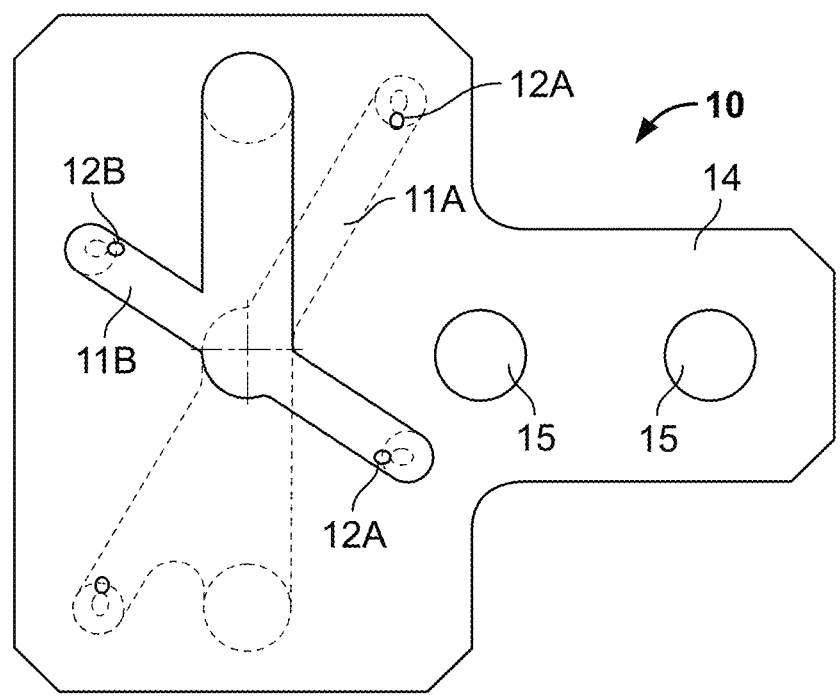
FIG. 2B illustrates a bottom view of an alternative contactless mixer having first and second nozzle arrays in accordance with some embodiments.

Indeed, while the contactless mixer depicted in FIGS. 2A and 2B is illustrated a monolithic device, the skilled artisan will appreciate that more than one contactless mixer may be positioned over a substrate, and each contactless mixer may include a plurality of nozzles in fluidic communication with one or more plenums and/or inlets. In this way, one or more contactless mixers may be appropriately configured to direct gas streams or pulses of gas to different areas on the surface of the substrate as detailed herein. For example, the systems herein may include two or more contactless mixers, each contactless mixer comprising a single inlet in communication with a single plenum, wherein the single plenum is in communication with a plurality of nozzles.

Figure 3A:
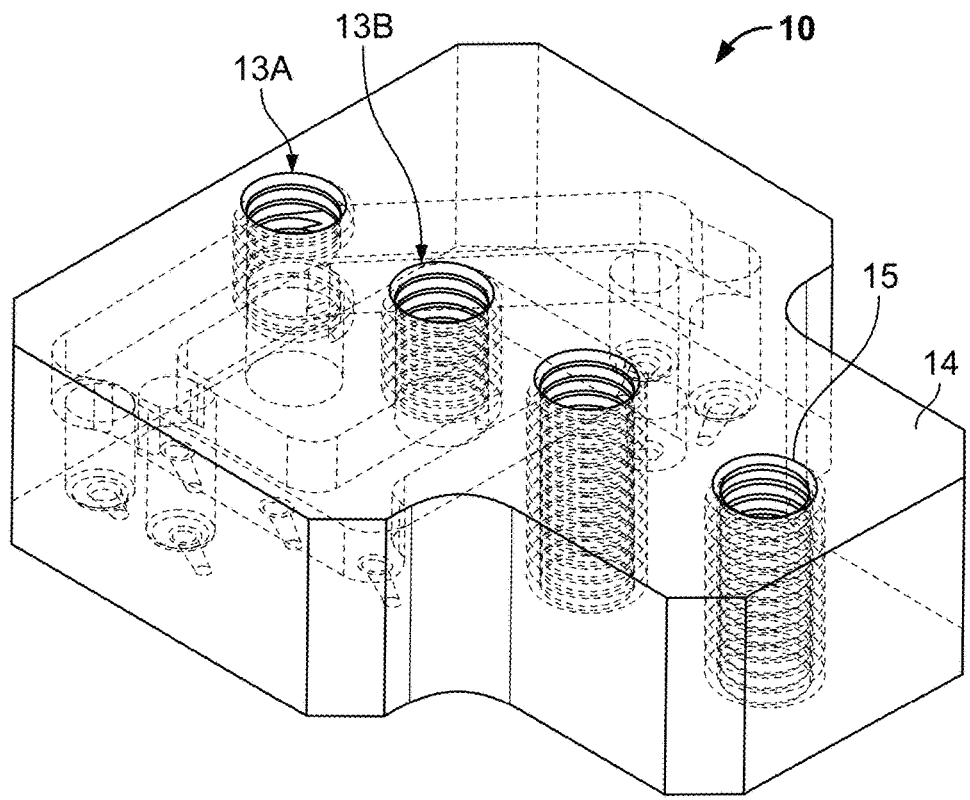
FIG. 3A illustrates a perspective view of a contactless mixer in accordance with some embodiments.
Figure 3B:
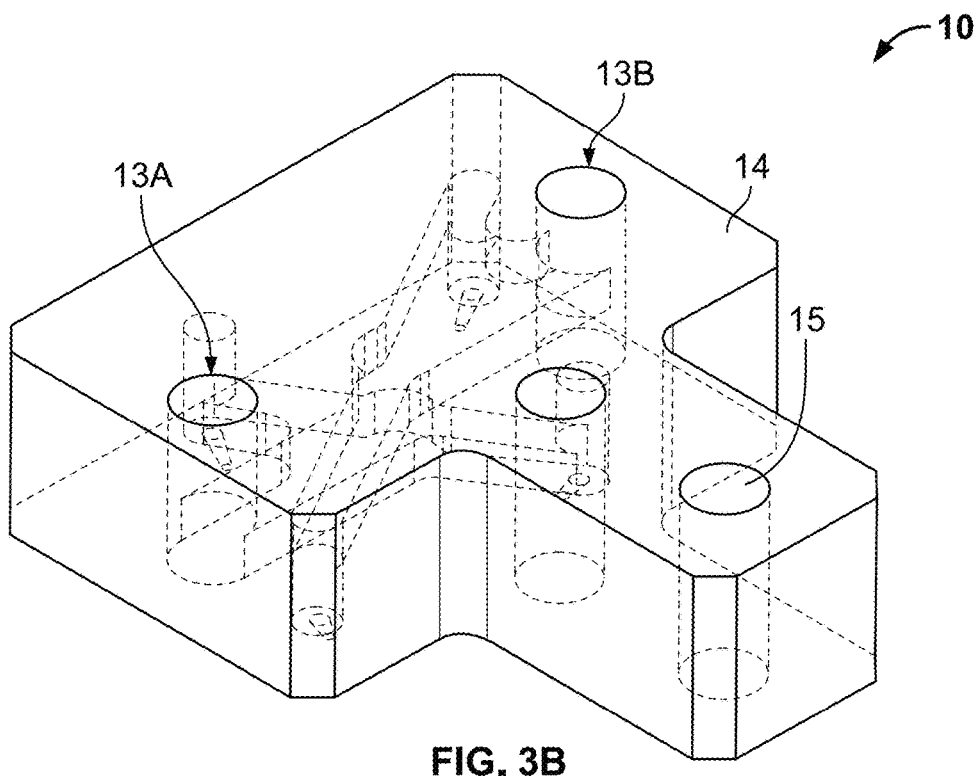
FIG. 3B illustrates a perspective view of an alternative contactless mixer in accordance with some embodiments.
Figure 4A:
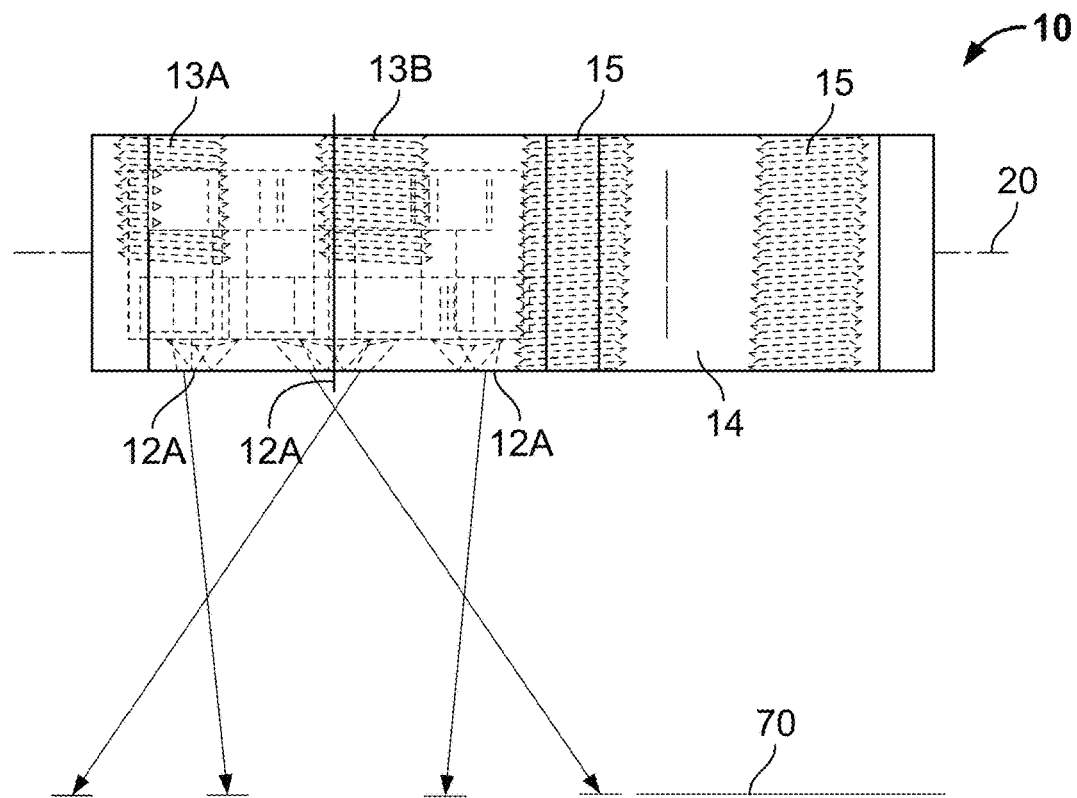
FIG. 4A provides a side view of a contactless mixer having a nozzle array configured to direct gas streams to the surface of a substrate in accordance with some embodiments.
Figure 4B:
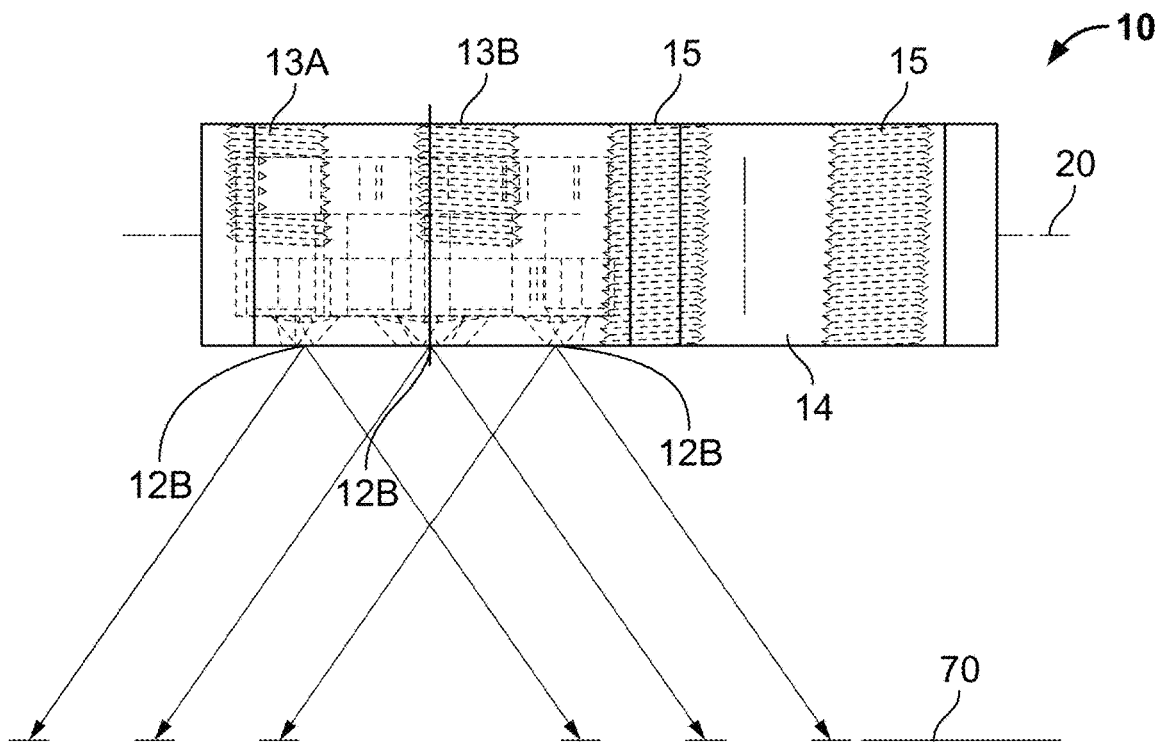
FIG. 4B provides a side view of an alternative contactless mixer having a nozzle array configured to direct gas streams to the surface of a substrate in accordance with some embodiments.

As illustrated in FIGS. 3A and 3B, in some embodiments the nozzles, plenums, and inlets are housed within a body 14, e.g. a monolithic body or a body comprised of multiple components, which is configurable for incorporation into a greater structure, e.g. a staining apparatus. the body 14 may include one or more mounting or attachment points 15 such that the contactless mixer may be removably incorporated into a staining apparatus or other instrument. In some embodiments, and as depicted in FIGS. 4A and 4B, the mounting or attachment points may be open at both their tops and bottoms, allowing for multiple points for connection to another apparatus or instrument. The body 14 may be comprised of a metal, an alloy, a polymer, or a co-polymer. In some embodiments, the body 14, the plenums, inlets, and nozzles may be fabricated by machining a solid block, molding, or otherwise securing multiple components together to form the contactless mixer 10. In some embodiments, the contactless mixer, and all components thereof, may be fabricated using 3D printing.

Figure 7:
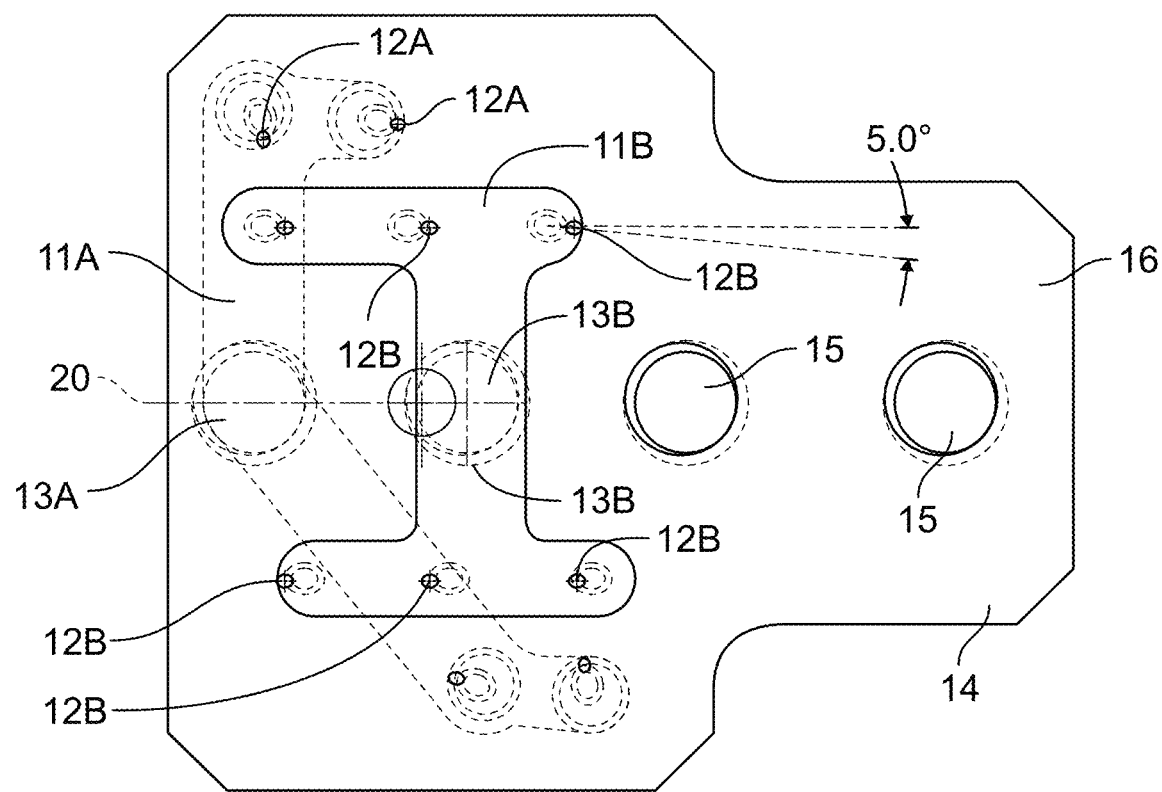
FIG. 7 illustrates a nozzle arrangement of a contactless mixer, wherein two sets of nozzles are illustrated, each set of nozzles in fluidic communication with a separate plenum in accordance with some embodiments.

In some embodiments, and with reference to at least FIGS. 1A and 1B, the plurality of nozzles 12A and 12B are arranged along a bottom surface 16 of the contact less mixer 10. In some embodiments, the plurality of nozzles is arranged in two or more rows. In some embodiments, the nozzles may be arranged parallel to each other, e.g. in rows parallel the longitudinal axis 20 of the contactless mixer. In other embodiments, the nozzles may be arranged in a staggered configuration. In other embodiments, the nozzles may be randomly configured in relation to one another. In embodiments where there are multiple sets of nozzles, each set of nozzles may independently be configured. For example, FIG. 7 illustrates a first set of nozzles (each individual nozzle labeled 12B) which are parallel to the longitudinal axis 20; and a second set of nozzles (each individual nozzle labeled 12A) which are substantially parallel to the longitudinal axis 20.

The skilled artisan will appreciate that there exist many variables which may determine the flow rate of gas through any individual gas nozzle, including the size and shape of the nozzles, the number of nozzles in fluidic communication with any individual plenum, not to mention the gas pressure supplied to the plenum through the inlet.

In some embodiments, each inlet is configured to receive a pressurized gas from an external gas source (e.g. a pump, an air compressor, a blower, a fan, or other means sufficient to pressurize a gas from a gas source, if not already sufficiently pressurized). In some embodiments, the flow rate of a gas passing through each inlet independently ranges from about 1 L/min to about 5 L/min. In other embodiments, the flow rate of a gas passing through each inlet independently ranges from about 2 L/min to about 25 L/min. Without wishing to be bound by any particular theory, it is believed that the flow rate through each nozzle in communication with the inlet is about the same.

Figure 8:
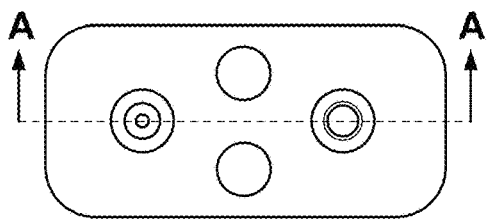
FIG. 8 illustrates alternative nozzle shapes for use in a contactless mixer in accordance with some embodiments.
Figure 8:
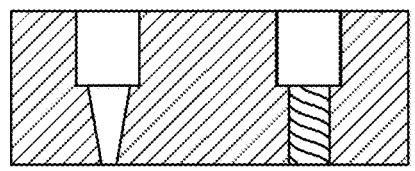
Figure 8:
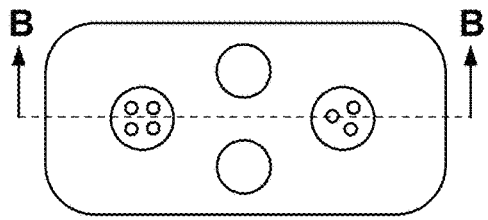
Figure 8:
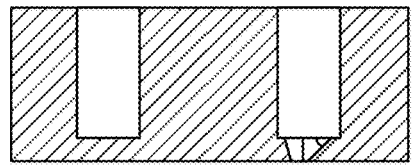
Figure 8:
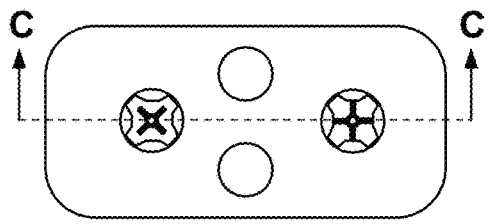
Figure 8:
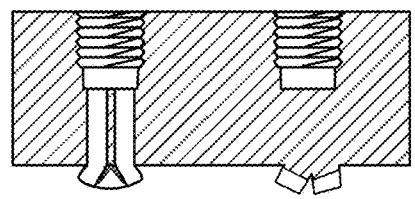

The nozzles may have any size or shape. For example, the nozzles may be cones (or substantially cone-shaped), helically rifled ports, small arrays of angled orifices with small internal cone openings, or arrays with uniform, round internal profiles and external bosses. Non-limiting examples of such additional nozzle shapes are illustrated in FIG. 8. In some embodiments, and regardless of the size or shape of the nozzles, the nozzles may be grouped together and, in some embodiments, the simultaneous operation of a group of nozzles may enable individual gas streams emanating from each individual nozzle to merge.

In some embodiments, the nozzles have an opening having a diameter ranging from about 0.025 inches (0.635 mm) to about 0.035 inches (0.889 mm). In other embodiments, the nozzles have an opening having a diameter ranging from about 0.010 (0.254 mm) inches to about 0.030 inches (0.762 mm). In yet other embodiments, the nozzles have an opening having a diameter of about 0.050 inches (1.27 mm). The skilled artisan will appreciate that the nozzles may each have the same or different diameter openings.

In some embodiments, the plurality of nozzles are evenly spaced from one another. For example, considering a nozzle having a circular opening, the nozzles 12 may be spaced from about 0.150 inches (3.81 mm) to about 0.300 inches (7.62 mm) apart from each other, as measured from the center of one circular opening to the center of another circular opening. In another example, and again assuming circular openings, the nozzles may be spaced from about 0.300 inches (7.62 mm) to about 0.500 inches (12.7 mm) apart from each other. In yet another example, and again assuming circular openings, the nozzles may be spaced from about 1.00 inches (25.4 mm) apart from each other. Of course, the skilled artisan will appreciate that the nozzles may have any geometric shape, e.g. circular, ovoid, rectangular, square, etc.

Figure 9A:
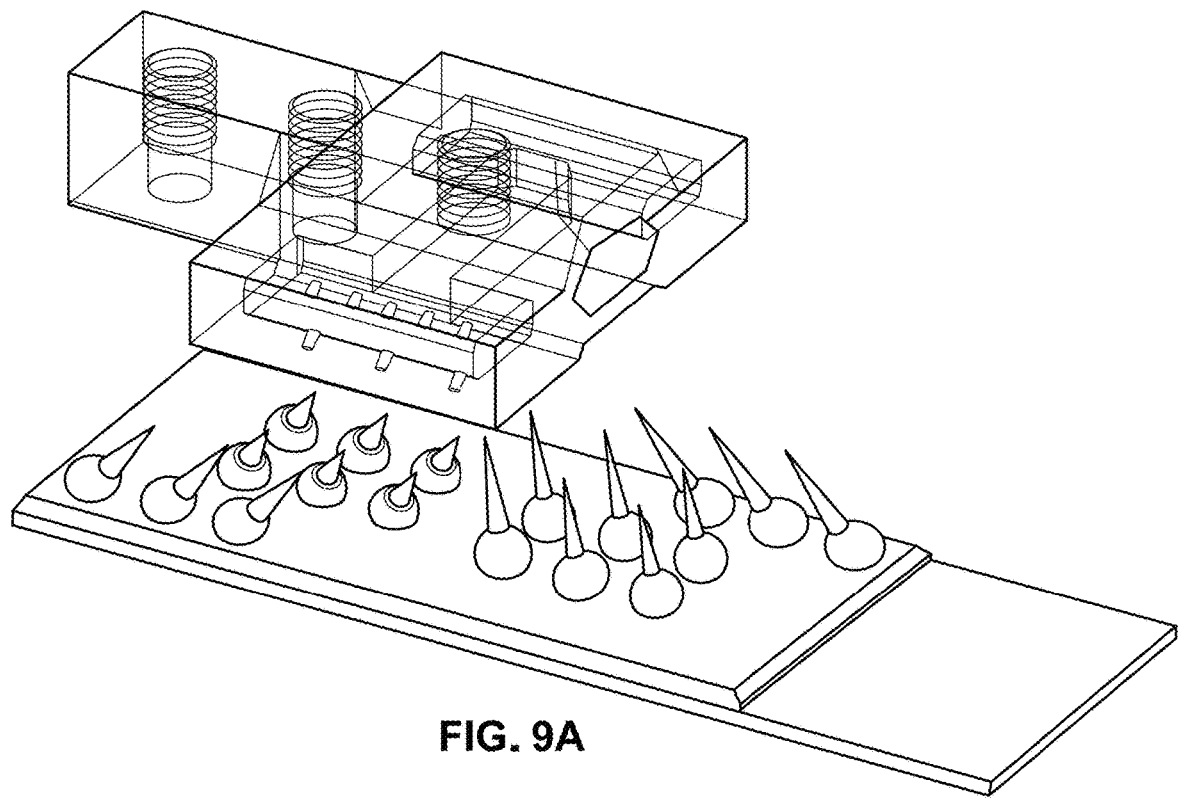
FIGS. 9A and 9B illustrate a contactless mixer having a plurality of nozzles, each nozzle directing a gas stream to a pre-determined location on the substrate (or fluid positioned on the substrate) in accordance with some embodiments.
Figure 9B:
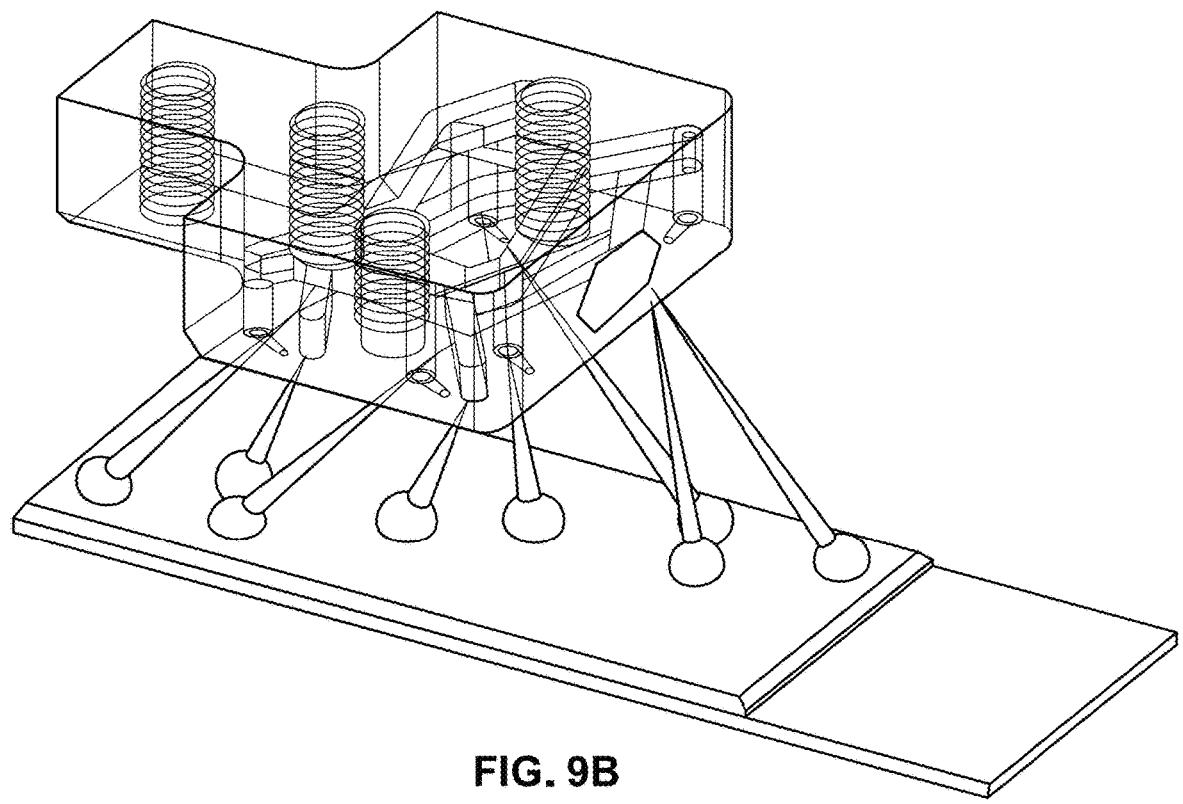

The nozzles may be provided at various angles such that gas flow from each nozzle may be directed as desired (e.g. directed at a specific angle in any of the coordinate directions toward the surface of a substrate) (see, for example, FIGS. 4A and 4B). The skilled artisan will appreciate that if any nozzle were to be considered as a single point, the nozzle may be formed within the body of the contactless mixer at any angle and in any direction (x, y, or z) such that a stream or jet of gas may be emanated from the nozzle (12A or 12B) and target the substrate surface (70) at a predetermined position at a predetermined angle of incidence (see, for example, FIGS. 9A and 9B). The skilled artisan will further appreciate that by combining nozzles having different angles in any of the x, y, or z dimensions into an array, the various angles along the various coordinates will enable movement of fluid on a substrate in a direction dictated by the sets of nozzles.

Figure 5A:
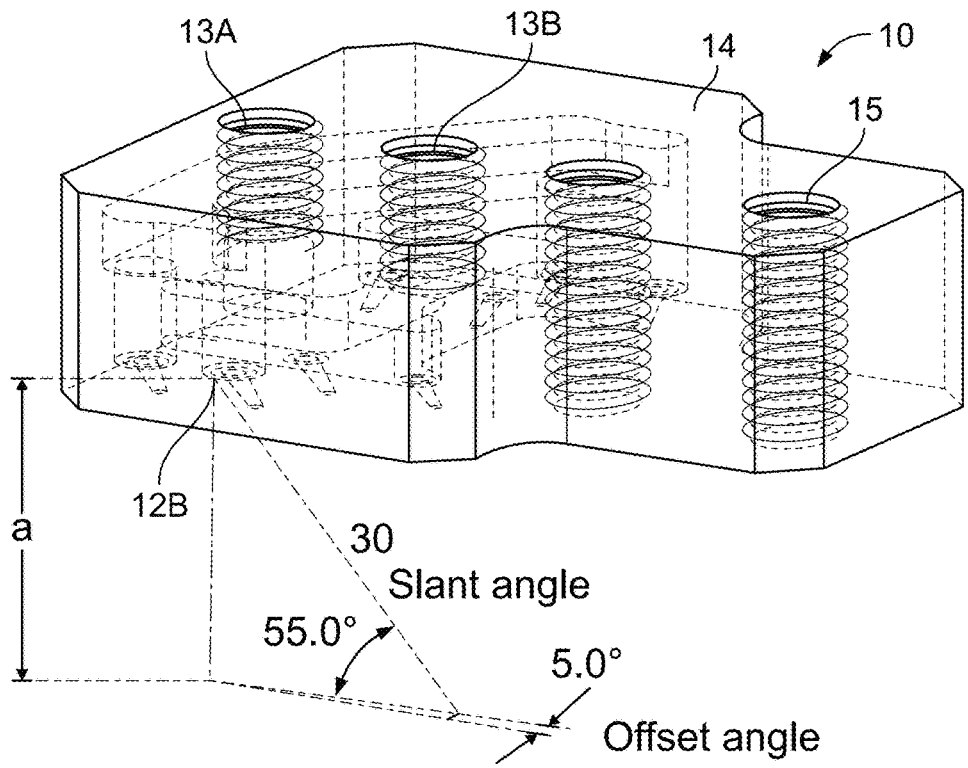
FIGS. 5A and 5B provide perspective views of a contactless mixer and gas streams emanating from nozzles within the contactless mixer in accordance with some embodiments.
Figure 5B:
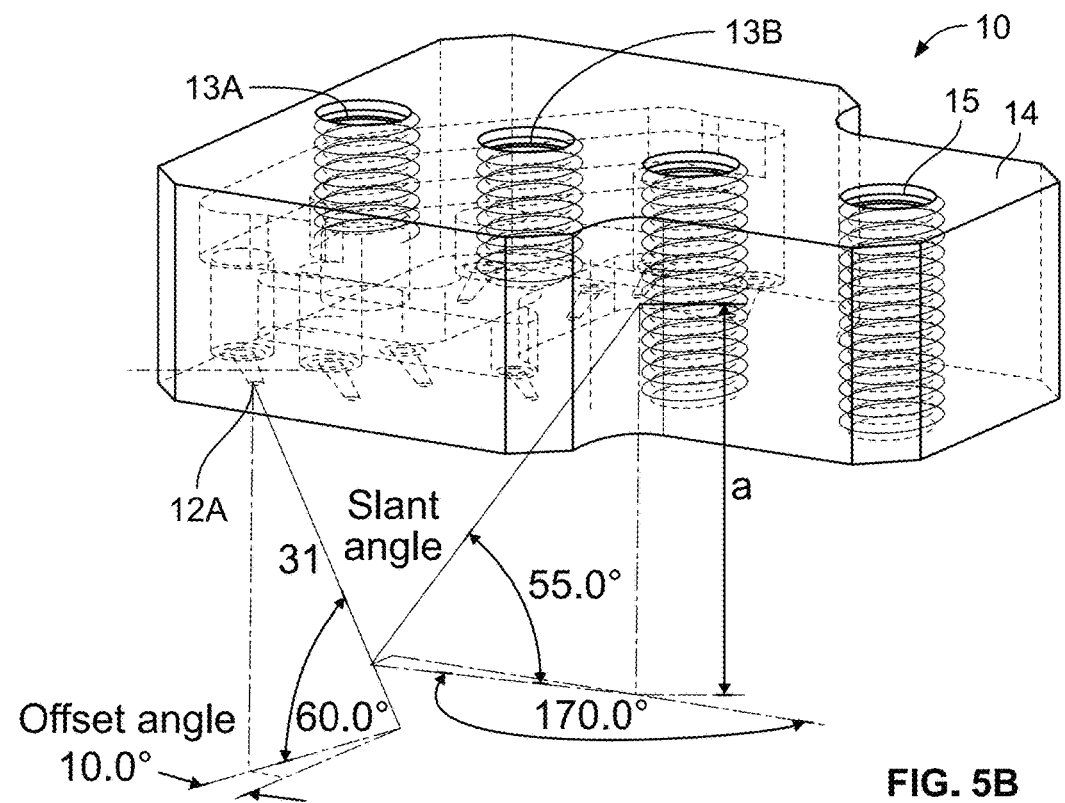

FIGS. 5A and 5B illustrate two nozzle angles denoted as a "slant angle" and an "offset angle." The skilled artisan will appreciate that by tuning the slant and offset angles of each nozzle independently, gas jets may be directed from the nozzle to different areas or positions (and at a particular entry angle) on a substrate positioned below the contactless mixer. In general, a slant angle refers to the angle relative to the substrate surface plane (i.e. a slant angle of 90 degrees is straight down (normal to the surface); and a slant of 0 degrees is parallel to the substrate surface). In some embodiments, the slant angle permits the gas streams emanating from the nozzles to impart a motion to a fluid on a substrate. In some embodiments, the slant angle may be defined by considering the angle of incidence formed between a gas stream emanating from a nozzle and the surface of a substrate positioned below the contactless mixer. In some embodiments, it is believed that the jets also interact with each other fluidically, making the actual incidence point on the substrate not "unpredictable," but governed by a combination of compressible fluid dynamics and the nozzle direction. For example, in FIG. 5A, gas stream 30 has a 55-degree angle of incidence with the substrate. On the other hand, and as depicted in FIG. 5B, gas stream 31 has a 60-degree angle of incidence with the substrate.

In some embodiments, the slant angle ranges from between about 5 degrees to about 90 degrees. In other embodiments, the slant angle ranges from between about 10 degrees to about 70 degrees. In other embodiments, the slant angle ranges from between about 15 degrees to about 65 degrees. In yet other embodiments, the slant angle ranges from between about 20 degrees to about 60 degrees. In further embodiments, the slant angle ranges from between about 25 degrees to about 55 degrees. In even further embodiments, the slant angle ranges from between about 30 degrees to about 55 degrees.

In addition to the slant angle, the nozzles may be defined by an offset angle, which refers to an angle from which the gas nozzle deviates from an axis parallel to the longitudinal axis 20 or an axis parallel to the horizontal axis 21 (sees FIGS. 5A and 5B). In some embodiments, the offset angle permits the gas streams emanating from the nozzles to impart directionality to a fluid on a substrate. In some embodiments, the offset angle ranges from between about 0 degrees to about 25 degrees. In other embodiments, the offset angle ranges from between about 5 degrees to about 15 degrees. In yet other embodiments, the offset angle ranges from between about 10 degrees to about 15 degrees.

By way of another example, FIG. 5B depicts a gas stream 31 having a slant angle of 60 degrees relative to a plane parallel to the horizontal axis 21, the gas stream also possessing an offset angle of 10 degrees relative to an axis parallel the horizontal axis 21. Likewise, FIG. 5A depicts a gas stream 30 having a slant angle of 55 degrees relative to a plane perpendicular to the longitudinal axis 20, the gas stream also being offset by 5 degrees relative to an axis parallel the longitudinal axis 20.

In the context of a microscope slide positioned beneath the contactless mixer 10, in some embodiments a set of nozzles (e.g. between 4 and 12 nozzles) are arranged such that they enable a bulk fluid flow to a fluid positioned on the surface of the slide. In some embodiments, the jets of gas emanating from some of the nozzles in the set of nozzles are directed toward longitudinal edges of the slide or towards fluid near the longitudinal edges of the slide.

Figure 6A:
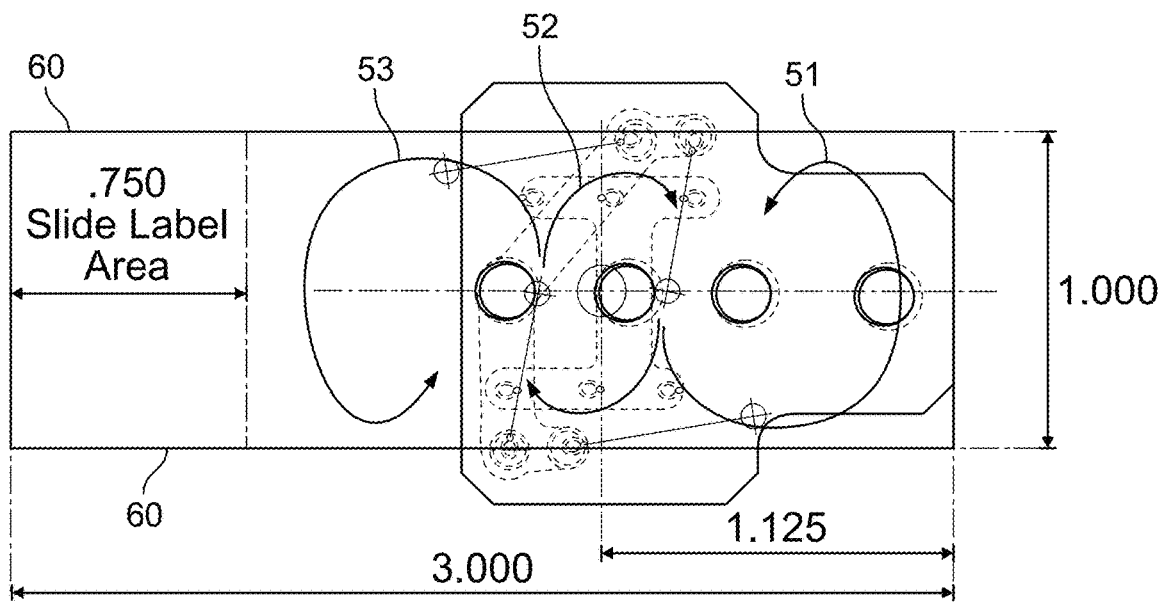
FIGS. 6A and 6B illustrate regional fluid movements induced by a nozzle array in accordance with some embodiments.
Figure 6B:
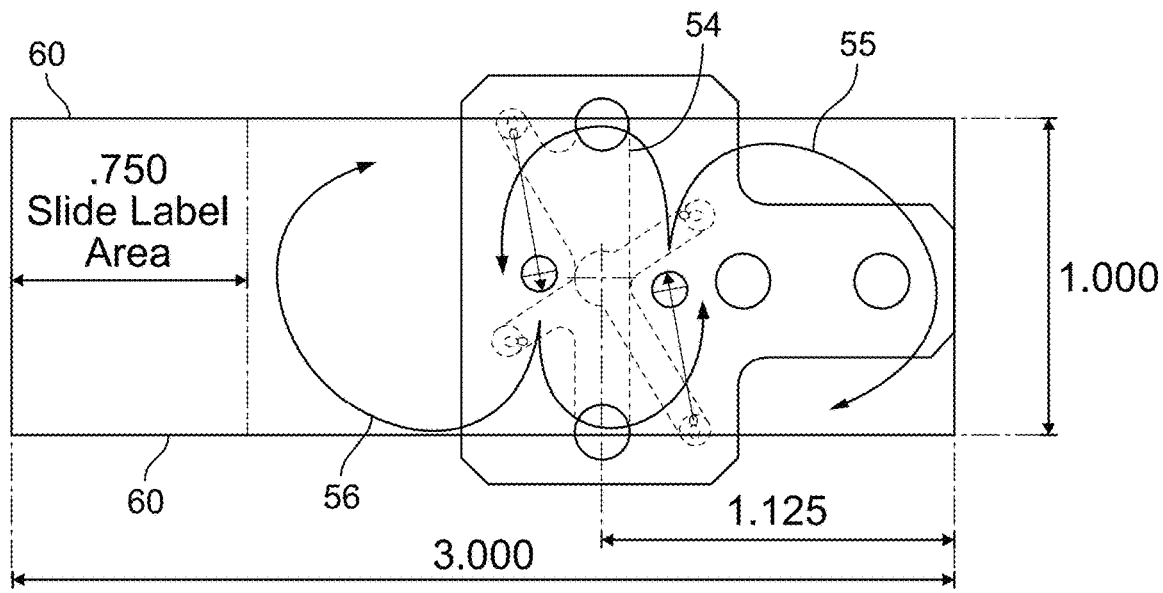
Figure 6C:
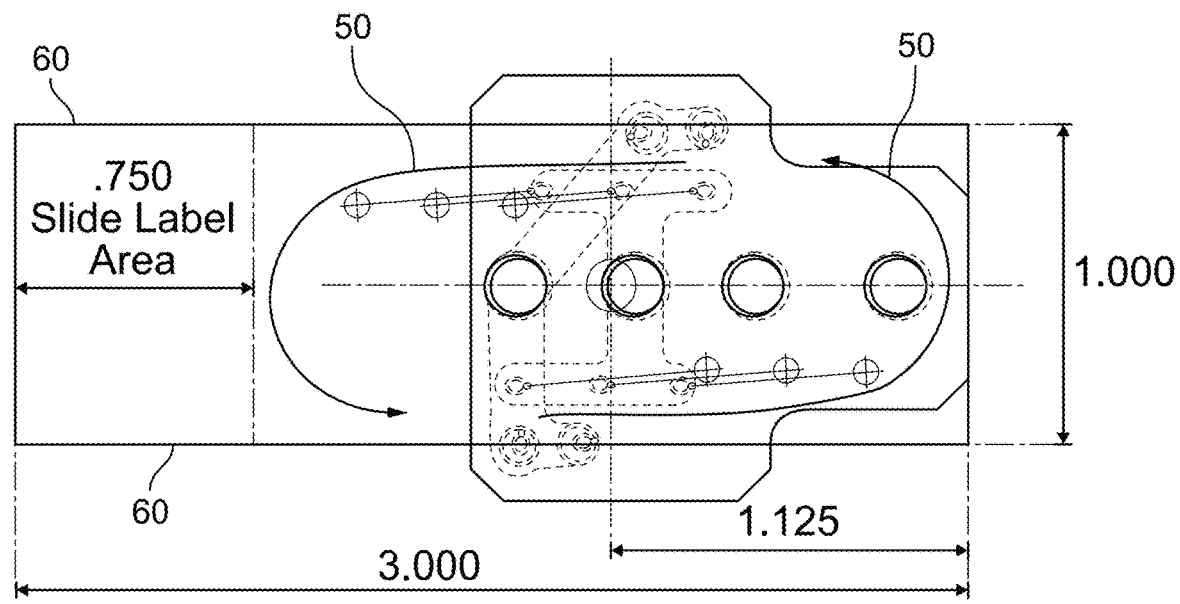
FIGS. 6C and 6D illustrate bulk fluid movements induced by a nozzle array in accordance with some embodiments.
Figure 6D:
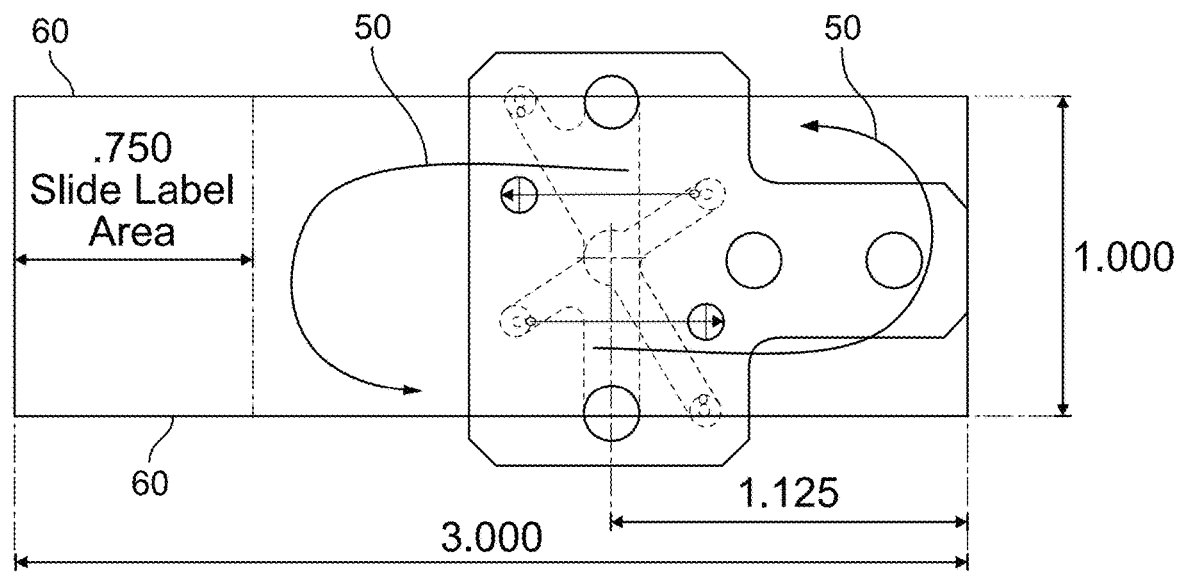

By way example, and with reference to FIGS. 6C and 6D, a first nozzle array may be adapted to impart a bulk fluid motion 50 to the fluid present on the surface of a substrate. Here, nozzles in the first nozzle array are arranged such that gas streams are directed substantially toward the edges 60 of a microscope slide, although not entirely parallel to the edges 60. While the resulting bulk fluid motion depicted in FIGS. 6C and 6D is in a counter-clockwise direction, the skilled artisan will appreciate that the nozzle array may be configured such that the bulk fluid motion is in a clockwise direction. FIGS. 6A and 6B also illustrates three discrete regional fluid flows 51, 52, and 53 or 54, 55, and 56 where each of the discrete regional fluid flows are imparted with a second nozzle array configured to direct gas streams to predetermined positions on the surface of the slide at predetermined angles of incidence. In FIG. 6A, regional fluid flows 51 and 53 are depicted in a counter-clockwise direction, while regional fluid flow 52 is in a clockwise direction. In FIG. 6B, Regional fluid flows 55 and 56 are depicted in a clockwise direction, while regional fluid flow 54 is in a counter-clockwise direction. The skilled artisan will also appreciate that the nozzles within the second nozzle array may be further adapted such that four or more regional fluid flows may be provided, where each adjacent regional fluid flow is in a different direction.

Automated Slide Processing Systems

In another aspect of the present disclosure is an automated slide processing apparatus comprising at least one contactless mixer configured to introduce pulses of a gas to a fluid or a puddle on the surface of the specimen-bearing microscope slide to effectuate mixing of one or more components within the fluid or puddle. In some embodiments, the automated slide processing system includes at least one contactless mixer having two discrete nozzle arrays, where each nozzle array is adapted to impart a flow to at least a portion of a fluid on the surface of a slide. In some embodiments, the automated slide processing system includes a contactless mixer having two discrete nozzle arrays, the first nozzle array adapted to impart bulk fluid flow in a first direction, and a second nozzle array adapted to impart at least one regional fluid flow to at least one portion of the fluid, wherein the at least one regional fluid flow is in a direction opposite the imparted bulk fluid flow. In some embodiments, the automated slide processing apparatus comprises at least two contactless mixers.

In some embodiments, specimen processing apparatus is an automated apparatus, such as the BENCHMARK XT instrument, the SYMPHONY instrument, the BENCHMARK ULTRA instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

Examples of commercially available H&E stainers include the VENTANA SYMPHONY (individual slide stainer) and VENTANA HE 600 (individual slide stainer) series H&E stainers from Roche; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH. The contactless mixer describes herein may be added to any of the aforementioned specimen processing systems.

The specimen processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation). The contactless mixer in fluidic communication with the microscope slide may be used to uniformly distribute any of these fixatives the slide or within another fluid, as detailed herein.

If the specimen is a sample embedded in paraffin, the sample can be deparaffinized with the specimen processing apparatus using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like. Again, any of these substances applied may be mixed or distributed through use of the contactless mixer described herein.

The specimen processing apparatus can apply a wide range of substances to the specimen, which may then be uniformly distributed and/or mixed using the contactless mixer in fluidic communication with the slide holder. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label. Labels can include radioactive isotopes, enzyme substrates, co-factors, ligands, chemiluminescent or fluorescent agents, haptens, and enzymes.

Automated IHC/ISH slide stainers typically include at least: reservoirs of the various reagents used in the staining protocols, a reagent dispense unit in fluid communication with the reservoirs for dispensing reagent to onto a slide, a waste removal system for removing used reagents and other waste from the slide, and a control system that coordinates the actions of the reagent dispense unit and waste removal system. In addition to performing staining steps, many automated slide stainers can also perform steps ancillary to staining (or are compatible with separate systems that perform such ancillary steps), including: slide baking (for adhering the sample to the slide), dewaxing (also referred to as deparaffinization), antigen retrieval, counterstaining, dehydration and clearing, and coverslipping. Prichard, Overview of Automated Immunohistochemistry, Arch Pathol Lab Med., Vol. 138, pp. 1578-1582 (2014), incorporated herein by reference in its entirety, describes several specific examples of automated IHC/ISH slide stainers and their various features, including the intelliPATH (Biocare Medical), WAVE (Celerus Diagnostics), DAKO OMNIS and DAKO AUTOSTAINER LINK 48 (Agilent Technologies), BENCHMARK (Ventana Medical Systems, Inc.), Leica BOND, and Lab Vision Autostainer (Thermo Scientific) automated slide stainers. Additionally, Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety.

Commercially-available staining units typically operate on one of the following principles: (1) open individual slide staining, in which slides are positioned horizontally and reagents are dispensed as a puddle on the surface of the slide containing a tissue sample (such as implemented on the DAKO AUTOSTAINER Link 48 (Agilent Technologies) and intelliPATH (Biocare Medical) stainers); (2) liquid overlay technology, in which reagents are either covered with or dispensed through an inert fluid layer deposited over the sample (such as implemented on VENTANA BenchMark and DISCOVERY stainers); (3) capillary gap staining, in which the slide surface is placed in proximity to another surface (which may be another slide or a coverplate) to create a narrow gap, through which capillary forces draw up and keep liquid reagents in contact with the samples (such as the staining principles used by DAKO TECHMATE, Leica BOND, and DAKO OMNIS stainers). Some iterations of capillary gap staining do not mix the fluids in the gap (such as on the DAKO TECHMATE and the Leica BOND). In variations of capillary gap staining termed dynamic gap staining, capillary forces are used to apply sample to the slide, and then the parallel surfaces are translated relative to one another to agitate the reagents during incubation to effect reagent mixing (such as the staining principles implemented on DAKO OMNIS slide stainers (Agilent)). In translating gap staining, a translatable head is positioned over the slide. A lower surface of the head is spaced apart from the slide by a first gap sufficiently small to allow a meniscus of liquid to form from liquid on the slide during translation of the slide. A mixing extension having a lateral dimension less than the width of a slide extends from the lower surface of the translatable head to define a second gap smaller than the first gap between the mixing extension and the slide. During translation of the head, the lateral dimension of the mixing extension is sufficient to generate lateral movement in the liquid on the slide in a direction generally extending from the second gap to the first gap. See WO 2011-139978 A1. It has recently been proposed to use inkjet technology to deposit reagents on slides. See WO 2016-170008 A1. This list of staining technologies is not intended to be comprehensive, and any of the contactless mixers described herein may be used in conjunction with such systems to effectuate distribution and mixing of any fluids present on a specimen bearing microscope slide, including staining reagents.

In some embodiments is an apparatus for automatically treating biological specimens, comprising: at least one slide tray (such as described herein) holding a plurality of slides in substantially horizontal positions, wherein the biological specimens are located on the slides; one or more workstations that receive the slide tray and perform one or more slide processing operations on the plurality of slides held in the slide tray; a transporter that moves the slide tray into and out of the one or more workstations; a fluidics module in fluid communication with the one or more workstations that supplies a reagent to the one or more workstations; a pneumatics module in fluid communication with the one or more workstations and the fluidics module; wherein the pneumatics module supplies vacuum and/or pressurized gas to the one or more workstations and the fluidics module; a contactless mixer posited above a slide in a slide tray to effectuate mixing; and a control module in electrical communication with the transporter, the one or more workstations, the fluidics module and the pneumatics module, wherein the control module coordinates function of components (including the contactless mixer and its various components) of the apparatus during treatment of the biological specimens.

In some embodiments, the apparatus for automatically treating biological specimens further includes a control system for independently controlling each contactless mixer such that mixing may be tailored for each slide. In some embodiments, the apparatus for automatically treating biological specimens further includes one or more sensors or other feedback mechanisms to enable monitoring of the mixing and/or distribution of the fluids dispensed onto the surface of the slide. In some embodiments, the control system includes a microprocessor and one or more microcontrollers, wherein the one or more microcontrollers receive instructions from the microprocessor and separately control one or more of the one or more workstations, the fluidics module, the contactless mixer, and/or the transporter. In some embodiments, the at least one of the workstations includes a moveable nozzle assembly, wherein the nozzle assembly includes one or more nozzles through which the reagent is delivered to a slide. The nozzles may be dispense nozzles.

In some embodiments, the workstation can perform a slide processing operation on one or more individual slides in a slide tray, for example, at least two or four slides in a slide tray, or it can simultaneously perform a slide processing operation (including mixing operations with the contactless mixer) on all of the slides in a slide tray. In some embodiments, one or more workstations dispense a reagent to slides in the slide tray without a substantial amount of the reagent that contacts a first slide contacting a second slide, thereby minimizing cross-contamination between slides. Such workstations can include one or more directional nozzles that dispense the reagent onto the slides, for example, the one or more directional nozzles can include a pair of directional nozzles that dispense the reagent in opposite directions across a surface of a slide. In more particular embodiments, the one or more directional nozzles can further include a directional nozzle that dispenses the reagent towards a bottom surface of a slide. In other embodiments, the one or more workstations can simultaneously dispense a reagent (for example, the same reagent) to at least two slides held in a slide tray within a given workstation, or the one or more workstations can simultaneously dispense a reagent (such as the same reagent) to all of the slides held in the slide tray within a given workstation. Following dispensing of the fluids and or reagents, a contactless mixer may be independently activated to distribute and/or mix the fluids on the surface of the slide.

In some embodiments is an automated method for processing a plurality of slides bearing biological tissue samples, comprising: performing a set of slide processing operations on the plurality of slides in one or more workstations while the slides in the plurality are held in spatially co-planar, substantially horizontal positions in a slide tray, wherein each of the plurality of slides are positioned in proximity with at least one contactless mixture; wherein the set of slide processing operations includes at least staining samples on the slides in the spatially co-planar, substantially horizontal positions by flowing one or more stains from at least one reagent container, through a fluidics module, and out at least one dispense nozzle positioned above the slide tray, and solvent-exchanging; transporting the slide tray holding the plurality of slides to an automated coverslipper workstation after performing the set of slide processing operations that include at least staining and solvent-exchange; coverslipping the plurality of slides held in the slide tray with separate respective coverslips using the automated coverslipper workstation while the plurality of slides are held in spatially co-planar, substantially horizontal positions in the slide tray such that the coverslips on the slides are spaced apart from one another; and removing the slide tray holding the coverslipped slides from the automated coverslipper workstation. In some embodiments, processing includes the steps of (i) baking the samples under a radiant heater; (ii) de-paraffinizing the samples; (iii) staining the samples by delivering one or more stains through one or more fluidic components and out one or more nozzles positioned generally above the slide tray, wherein the one or more fluidic components fluidically connect at least one reagent container holding the one or more stains to the one or more nozzles; (iv) solvent-exchanging the samples; and (v) coverslipping the samples with separate coverslips, wherein the aforementioned steps are automatically performed by an apparatus comprising two or more workstations between which the slide tray holding the slides is moved during processing.

In some embodiments, after the specimens are processed, a user can transport specimen-bearing slides to the imaging apparatus. In some embodiments, the imaging apparatus is a brightfield imager slide scanner. One brightfield imager is the iScanCoreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application Publication No. 2014/0178169, filed on Feb. 3, 2014, entitled IMAGING SYSTEMS, CASSETTES, AND METHODS OF USING THE SAME. International Patent Application No. PCT/US2010/002772 and U.S. Patent Application Publication No. 2014/0178169 are incorporated by reference in their entities. In other embodiments, the imaging apparatus includes a digital camera coupled to a microscope.

Control System

In some embodiments, the contactless mixer may be controlled with a controller. In some embodiments, the control system may be in communication with actuators, valves, and/or solenoids for controlling the air entering the inlets of the contactless mixer, or for enabling pulsation of gas streams from each of the nozzles in fluidic communication with the inlets. In some embodiments, the control system further includes a computer (including at least one processor and a non-tangible memory comprising instructions and for recording information) that controls the opening and closing of actuators, valves, and/or solenoids such that nozzle arrays or sets of nozzles forming part of the contactless mixer may be operated (e.g. pulsed at certain time intervals are certain frequencies). The control system permits dynamic adjustment of the actuators, values, and/or solenoids such that flow and pressure may be controlled along each plenum independently.

In some embodiments, the control system may further comprise one or more sensors for monitoring the gas jets directed toward the microscope slide. In other embodiments, the control system may comprise one or more feedback mechanisms to monitor mixing of the one or more fluids present on the surface of the slide.

In some embodiments, the control system may further comprise one or more sensors for monitoring the surface tension, volume of fluid, temperature of fluid and other mechanical properties of the fluid on the microscope slide. In other embodiments, the control system may comprise one or more feedback mechanisms to monitor the integrity of the fluid on the slide and dynamically adjust the actuators, values, and/or solenoids such that flow and pressure may be controlled along each plenum independently to prevent or reduce forcing one or more fluids off the slide.

Optical or video detection and analysis can be employed to optimize mixing. By way of example, optical or video detection may be used to detect changes in color as a pigmented reagent mixes into a clear fluid. Other optical measurements such as spectral excitation, absorption, light scattering, fluorescence, luminescence, emission, polarization microscopy, Raman scattering, and spectral analysis also can be used to monitor mixing of fluids in contact with the sample on the surface of the microscope slide. The data may be acquired and analyzed by the computer or control system that is controlling the mixing process. For example, if sufficient mixing is achieved based on the received data, the contactless mixer may be turned off. By way of another example, if mixing is insufficient based on the received data, the controller may increase the time in which the contactless mixer is turned on, or the controller may change one or more of the parameters associated with contactless mixing, e.g. gas jet pulse frequency, gas pressure, or the set of nozzles delivering the gas.

Methods

The present disclosure also provides methods of mixing fluids present on a substrate, e.g. a slide, using the contactless mixers described herein. By "mixed with the contactless mixer" it is meant that the contactless mixer is operated to effectuate a mixing, distribution, or replenishment of fluids within a puddle on a surface of a specimen bearing slide. As noted herein, the contactless mixer is configured such that pulses of gas (e.g. jets of gas or streams of gas) emanated from a plurality of nozzles or a series of sets of nozzles of the contactless mixer impart a fluid flow (e.g. a stirring) to the fluid(s), causing movement of the fluid in at least one direction in at least one area of the slide. As used herein, a "pulse" of gas may mean that a gas stream is "turned on" for a specific period of time, e.g. 1 second, and then "turned off." This can be considered a continuous stream. Likewise, a "pulse" may also mean "turning on" a gas stream for a set period of time during which the gas is modulated at a particular frequency, e.g. a 1 Hz frequency applied to a gas stream for a period of 5 seconds (i.e. the pulse may be a series of "turning on" and "turning off" for a set period of time).

Therefore, another aspect of the present disclosure provides methods of distributing and/or mixing a fluid on the surface of a microscope slide by introducing pulses of gas to the puddle on the surface of the specimen bearing slide. In some embodiments, introduction of the pulsed gas jets to the fluid causes movements and/or vibrations in the fluid, thus providing bulk fluid flow and/or regional fluid flows, ultimately enabling a substantially uniform distribution of a fluid over a biological sample. For example, and in some embodiments, a fluid may be dispensed to a predetermined area on the surface of a microscope slide and, upon activation of the contactless mixer and the introduction of pulsed gas jets, the fluid may be distributed beyond the initial area of dispensing. In some embodiments, the distribution of fluids on the surface of the microscope slide through the introduction of pulsed gas jets may be used to facilitate the replenishment of fluids (e.g. a reagent) on a biological sample mounted on the surface of the slide. For example, a biological sample may absorb a reagent deposited on its surface (or may unevenly absorb a reagent) and eventually an amount of reagent in contact with the biological sample may be substantially depleted (or depleted from a particular region or portion of the sample). Activation of the contactless mixer (or even individual nozzle arrays within the contactless mixer) may facilitate the distribution of another aliquot of the same reagent to the biological sample, thus replenishing the reagent in contact with the biological sample. Activation of a contactless mixer (or individual nozzle arrays) may also facilitate the redistribution of the reagent from other areas of the slide to the biological sample faster than diffusional means, thus replenishing the fluid or reagent in contact with the biological sample.

In other embodiments, a first fluid may already be present on the surface of the microscope slide (e.g. a fluid puddle) and, following introduction of a second fluid, e.g. a reagent introduced via a dispenser, the second fluid may be substantially uniformly distributed within the first fluid following the introduction of pulsed gas jets from the contactless mixer. In some embodiments, by "substantially uniformly distributed," it is meant that reagent concentration between two separate points on the slide differ by no greater than 10% in magnitude. In other embodiments, by substantially uniformly distributed, it is meant that reagent concentration between two separate points on the slide differ by no greater than 5% in magnitude. In yet other embodiments, by substantially uniformly distributed, it is meant that reagent concentration between two separate points on the slide differ by no greater than 2% in magnitude. Of course, the skilled artisan will appreciate that any number of fluids may be deposited on the surface of a microscope slide and each of those fluids may be mixed, i.e. substantially uniformly distributed within one another, through the introduction of the pulsed air jets.

In some embodiments, the methods disclosed herein are suitable for distributing and/or mixing any volume fluid on the surface of the slide. In some embodiments, the volume of fluid able to be distributed and/or mixed according to the method disclosed herein ranges from about 50 μL to about 2000 μL. In some embodiments, the volume of fluid able to be distributed and/or mixed according to the method disclosed herein ranges from about 50 μL to about 1000 μL. In other embodiments, the volume of fluid able to be distributed and/or mixed according to the method disclosed herein ranges from about 50 μL to about 750 μL. In yet other embodiments, the volume of fluid able to be distributed and/or mixed according to the method disclosed herein ranges from about 50 μL to about 500 μL. In yet other embodiments, the volume of fluid able to be distributed and/or mixed according to the method disclosed herein ranges from about 100 μL to about 500 μL. The skilled artisan will be able to select an appropriately configured contactless mixing nozzle array, including all operating parameters (e.g. the employment of specific nozzles having a particular configuration, air jet pulse frequency, time, pressure, and/or flow rate) such that the entire volume present on the slide is substantially uniformly distributed and/or mixed as desired.

Generally, the methods comprise (i) introducing a fluid to the surface of a slide; and (ii) introducing pulses of gas jets to the slide, the pulses of gas jets introducing fluid movements and/or vibrations to the slide. In some embodiments, the methods comprise additional steps including, but not limited to, (a) detection steps for feedback control of the contactless mixer, (b) fluid removal steps; and/or (c) additional fluid dispensing steps.

In some embodiments, a method of processing specimen-bearing slides includes: (i) contacting a sample on the specimen-bearing slide with a first reagent; and (ii) uniformly distributing the first reagent on the specimen-bearing by introducing pulsed air jets to the specimen-bearing slide. As noted herein, the pulsed air jets may be delivered to the puddle through an appropriately configured contactless mixer, such as one described herein that facilities at least bulk mixing of the fluids or reagents within the puddle and/or regional mixing of fluids or reagents. In some embodiments, pulsed jets of air are emanated from a first nozzle array and a second nozzle array of the contactless mixer. In some embodiments, the pulsed jets of air from the first and second nozzle arrays are staggered in timing, thus allowed for alternating periods of bulk fluid flow and regional fluid flows. In some embodiments, the uniform distribution permits advancement of fluid to areas of the slide devoid of the fluid.

In some embodiments, the reagent is introduced into a first fluid puddle on the surface of the slide (e.g. a puddle comprising a buffer) or in proximity to a first puddle on the slide. In some embodiments, the reagent is detection probe. In some embodiments, the detection probes are binding moieties specific for a particular target within the biological sample. In some embodiments, the detection probes utilized are primary antibodies, namely primary antibodies which enable detection of protein targets (or epitopes of protein targets) within the sample. In some embodiments, the primary antibody is conjugated to a detectable label, such as a fluorophore, a hapten, or an enzyme. In other embodiments, the detection probes are nucleic acid probes which enable detection of nucleic acid sequence targets within the sample. In other embodiments, the specific binding moieties are nucleic acid probes, where the nucleic acid probes are conjugated to a detectable label, such as a fluorophore, a hapten, or an enzyme.

In some embodiments, pulsing with any of the nozzles occurs at a frequency ranging from between about 0.5 Hz to about 15 Hz. In some embodiments, the acoustic source operates at a frequency ranging from between about 0.5 Hz to about 10 Hz. In some embodiments, pulsing with any of the nozzles occurs at a frequency ranging from between about 1 Hz to about 10 Hz. In some embodiments, pulsing with any of the nozzles occurs at a frequency ranging from between about 1 Hz to about 20 Hz.

In some embodiments, a first set of nozzles may operate at a first frequency or a first range of frequencies; while a second set of nozzles may operate at a second frequency or a second range of frequencies. Likewise, any set of nozzles of the contactless mixer may operate for a first period of time at a first frequency, and then operate for a second period of time at a second frequency. In other embodiments, a particular set of nozzles of the contactless mixer may operate initially at a first frequency, and the frequency may be increased or decreased over time (e.g. ramped up or ramped down over time at a predetermined interval). For example, a first frequency may be 10 Hz and a second frequency may be 20 Hz, and the frequency may be ramped from 10 Hz in 1 Hz increments every 0.5 seconds until the 20 Hz frequency is attained. In other embodiments, the pneumatic source employs frequency modulation, whereby the frequency is deviated by a value which is +/−20% of a predetermined frequency value.

In some embodiments, following introduction of the reagent, gas jet pulses are delivered to the puddle from at least one nozzle array of the contactless mixer to effectuate at least bulk fluid mixing within the puddle. In some embodiments, pulsed gas jets are introduced for a total time period ranging from between about 0.5 seconds to about 30 seconds. In some embodiments, pulsed gas jets are introduced for a time period ranging from between about 0.5 seconds to about 20 seconds. In other embodiments, pulsed gas jets are introduced for a total time period ranging from between about 1 second to about 15 seconds. In other embodiments, pulsed gas jets are introduced for a total time period ranging from between about 5 second to about 15 seconds. In other embodiments, pulsed gas jets are introduced for a total time period ranging of about 10 seconds.

In some embodiments, the pulsing of the sample with gas jets may be at constant intervals. For example, the sample may be pulsed with gas jets for a certain predetermined amount of time (e.g. 0.5 second intervals) followed by a predetermined amount of time in which no gas jets are introduced (e.g. 1 second intervals). In other embodiments, the pulsing of the sample with gas jets may be at non-constant intervals. In other embodiments, the determination as to whether the pulse the sample with gas jets may be determined by using a detector which provides feedback as to the extent of mixing, or a detector which is able to detect whether a portion of a slide or sample requires replenishment.

In some embodiments, the sample may be pulsed with pulsed gas jets for set periods during which a reagent is in contact with the sample (e.g. during an incubation period). For example, if an antibody is introduced to a sample and a protocol calls for the antibody to remain in contact with the sample for a 360 second time period (e.g. an incubation period), gas jets may be introduced into the sample for a predetermined amount of time at set intervals during the incubation period. For example, a pulse of gas may be introduced for 5 second time intervals at times 0, +30 seconds, +60 seconds, +90 seconds, +120 seconds, +150 seconds, +180 seconds, +210 seconds, +240 seconds, +270 seconds, +300 seconds, and +330 seconds following introduction of the antibody. Of course, rather than pulse the sample with gas jets at predetermined intervals or for predetermined amounts of time, a feedback control device (such as described herein) may be utilized to determine whether the introduction of pulses is necessary, including the length of time in which the contactless mixer may be operated.

In embodiments where the contactless mixer includes multiple nozzle arrays, gas jets may be pulsed from each nozzle array sequentially. For example, gas jets may be pulsed from a first nozzle array for a first time period, followed by pulsing with gas gets from a second nozzle array for a second time period. The sequential operation of the first and second nozzle arrays may occur one or more times, e.g. between 1 and 20 times. By way of example, gas jets within the first nozzle array may be pulsed for a period of 5 seconds to impart a bulk fluid flow to a puddle present on the upper surface of the slide. Subsequently, pulsing with gas jets from the second array for 5 seconds may impart regional fluid flows to portions of the fluid present on the slide. In this example, the process of sequential operation may repeat 3 or more times. The skilled artisan will appreciate that each nozzle array may be independently operated and each array may be pulsed for any period of time to effectuate sufficient mixing.

In other embodiments, the slide or sample may be pulsed with gas from a contactless mixer (from any of one or more sets of nozzles or nozzle arrays) each time fluid is dispensed to the slide or sample and for any purpose (i.e. fluid replenishment, fluid dispersing, and/or fluid mixing). For example, if a protocol calls for adding a certain aliquot of fluid every two minutes, pulses of gas may be supplied to the slide and/or sample for at least a predetermined amount of time each time an aliquot is added. Of course, additional pulses may be supplied between dispense cycles as needed.

In some embodiments, the method further includes detecting whether the fluid and/or reagent are adequately distributed or mixed (e.g. by using the feedback mechanisms described herein). If the detection step determines that the fluid and/or reagent are not adequately mixed, operating parameters of the contactless mixer may be adjusted, e.g. pulse frequency, time, pressure, flow rate, and/or nozzle selection.

In addition, if a specific system or instrument calls for moving a slide between different stations or processing areas of the system or instrument (e.g. a sample staining area, a sample incubation area), the contactless mixer may be utilized to deliver pulsed jets of gas into the sample before and/or after movement of the slide to ensure that fluid is adequately distributed and/or mixed before, during, and after any such movements. Following mixing of the first reagent into the first fluid puddle, the mixed first reagent/fluid puddle may be removed from the surface of the slide. Subsequently, first detection reagents may be introduced and then distributed on the surface of the slide or mixed with a second fluid puddle existing on the slide. In some embodiments, the first detection reagents are specific for a label of the detection probe. For example, if the label is an enzyme, a substrate (a detectable moiety, e.g. a chromogenic moiety) for the enzyme may be introduced such that a colored precipitate may be detected. In yet other embodiments, an anti-label antibody (a secondary antibody) is introduced to elicit detection, where the anti-label antibody is specific to the label of the conjugate. For example, if the label is a hapten, an anti-hapten antibody specific to the hapten label is introduced, where the anti-hapten antibody includes a detectable moiety. In some embodiments, the detectable moiety of the anti-hapten antibody is an enzyme, and a substrate for the enzyme is further introduced to detect the conjugate and target. The detectable moiety may then be detected according to processes known to those of ordinary skill in the art. The introduction of detection probes and/or detection reagents may be repeated "n" number of times to account for any desired number of targets within the sample.

The methods disclosed herein are also suitable for multiplex assays. For example, a first detection probe specific to a first target and a second detection probe specific to a second target may be introduced simultaneously or sequentially. Once both the first and second detection probes are introduced to the sample, the contactless mixer may be utilized to introduce pulses of gas to the sample such that the first and second detection probes are mixed and uniformly distributed. Without wishing to be bound by any particular theory, it is believed that an even distribution of the first and second detection probes may facilitate a uniform detection probe concentration during staining and/or a reduction in staining artifacts. The skilled artisan will appreciate that any number of detection probes may be simultaneously or sequentially introduced to the sample on the surface of the slide, and the "n" number of detection probes may be mixed with the contactless mixer of the present disclosure. Following introduction of the detection probes, one or more detection reagents may be introduced, again either simultaneously and/or sequentially, and again mixed with the contactless mixer.

In some embodiments, a method of replenishing a fluid or reagent includes: (i) contacting a sample on the specimen-bearing slide with a first reagent; (ii) allow time for the reagent to react with or be absorbed by the sample; and (iii) uniformly distributing the first reagent on the specimen-bearing by introducing pulses of gas to the specimen-bearing slide from a contactless mixing apparatus, thereby replenishing reagent to those areas that have been at least partially depleted of reagent. In some embodiments, the method optionally includes the step of introducing additional aliquots of the first reagent prior to uniformly distributing the first reagent through the introduction of the pulses of gas. In some embodiments, the reagent is introduced into a first fluid puddle on the surface of the slide (e.g. a puddle comprising a buffer). In some embodiments, the reagent is a detection probe. In some embodiments, the detection probes are binding moieties specific for a particular target within the biological sample. In some embodiments, the detection probes utilized are primary antibodies, namely primary antibodies which enable detection of protein targets (or epitopes of protein targets) within the sample. In some embodiments, the primary antibody is conjugated to a detectable label, such as a fluorophore, a hapten, or an enzyme. In other embodiments, the detection probes are nucleic acid probes which enable detection of nucleic acid sequence targets within the sample. In other embodiments, the specific binding moieties are nucleic acid probes, where the nucleic acid probes are conjugated to a detectable label, such as a fluorophore, a hapten, or an enzyme.

In some embodiments, a method of processing specimen-bearing slides includes: (i) dispensing a first fluid onto a first portion of a microscope slide; and (ii) distributing the first fluid on the specimen-bearing by introducing pulses of gas to the specimen-bearing slide with a contact less mixer apparatus. In some embodiments, the first fluid is distributed from the first portion of the microscope slide to at least a second portion of the microscope slide. In some embodiments, the first portion of the slide is a portion which does not comprise a sample; and wherein the second portion of the slide includes a biological sample. In some embodiments, the fluid includes a detection probe. In some embodiments, the detection probes are binding moieties specific for a particular target within the biological sample. In some embodiments, the method further includes the step of introducing additional aliquots of fluid to the slide (at any region), and then distributing the fluid through the introduction of pulsed jets of gas.

EXAMPLES

Example 1—Contactless Mixer

Figure 10A:
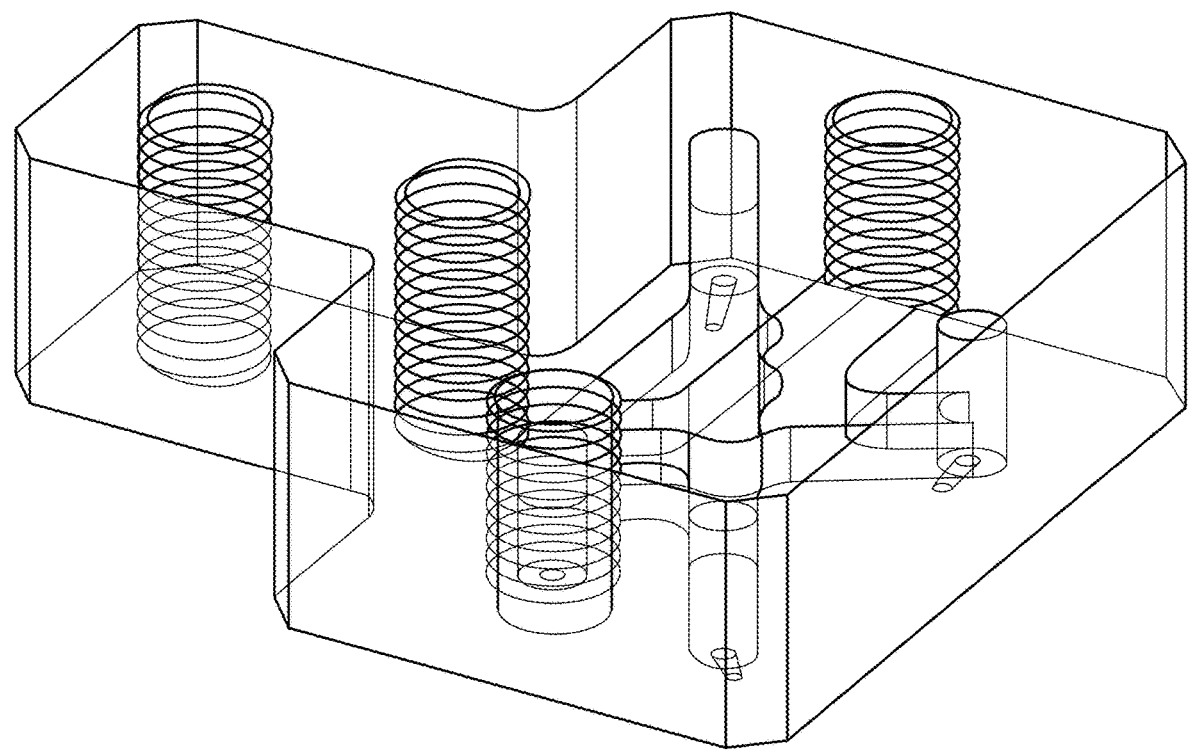
FIG. 10A illustrates a contactless mixture having a plurality of inlets and nozzles.
Figure 10B:
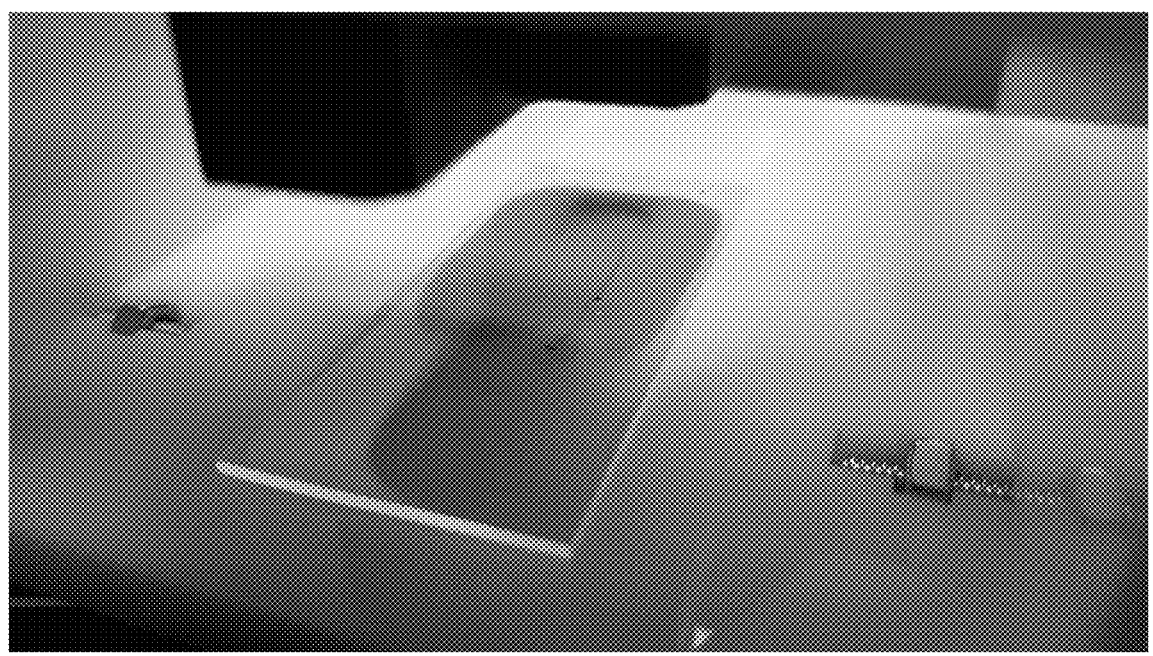
FIGS. 10B and 10C illustrate the mixing of a dye within a fluid, the dye being substantially uniformly distributed within the fluid after operation of the contactless mixer.
Figure 10C:
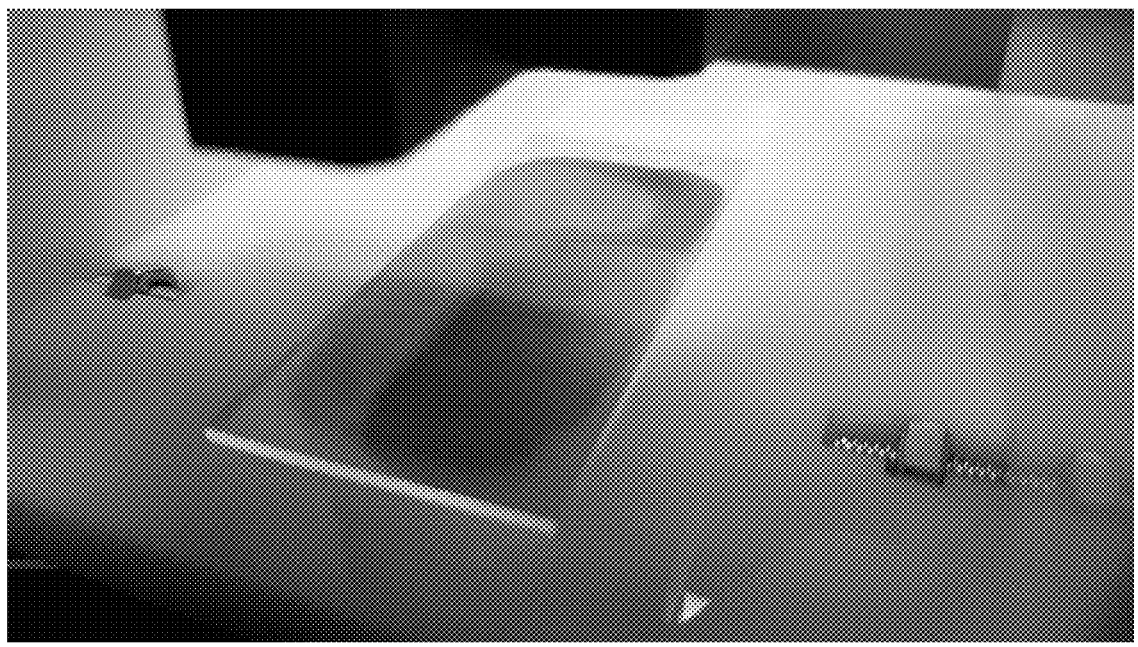

A nozzle array (see FIG. 10A) was developed to enable mixing in two deliberate stages. During a first stage, the entire slide would be mixed in a single swirl; and then during a second stage, the slide would be divided into three swirls for "cross mixing" the results of the single swirl. Only two jets were used for each stage to simplify the design and reduce the chance for interference among the jets. This array illustrated the idea for whole slide and cross mixing. FIGS. 10B and 10C illustrate the result of a dye being mixed with a fluid (e.g. a reaction buffer) after operation of the contactless mixer.

Example 2—Contactless Mixer

Figure 11A:
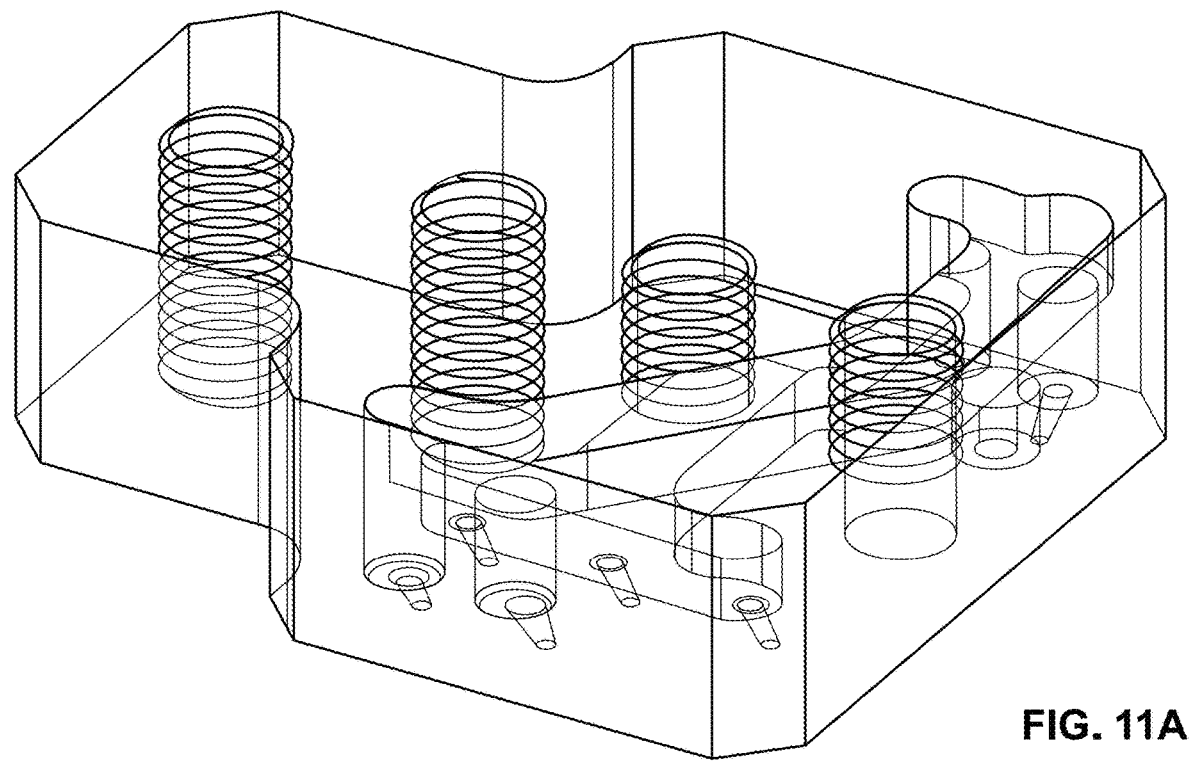
FIG. 11A illustrates a contactless mixture having a plurality of inlets and nozzles.
Figure 11B:
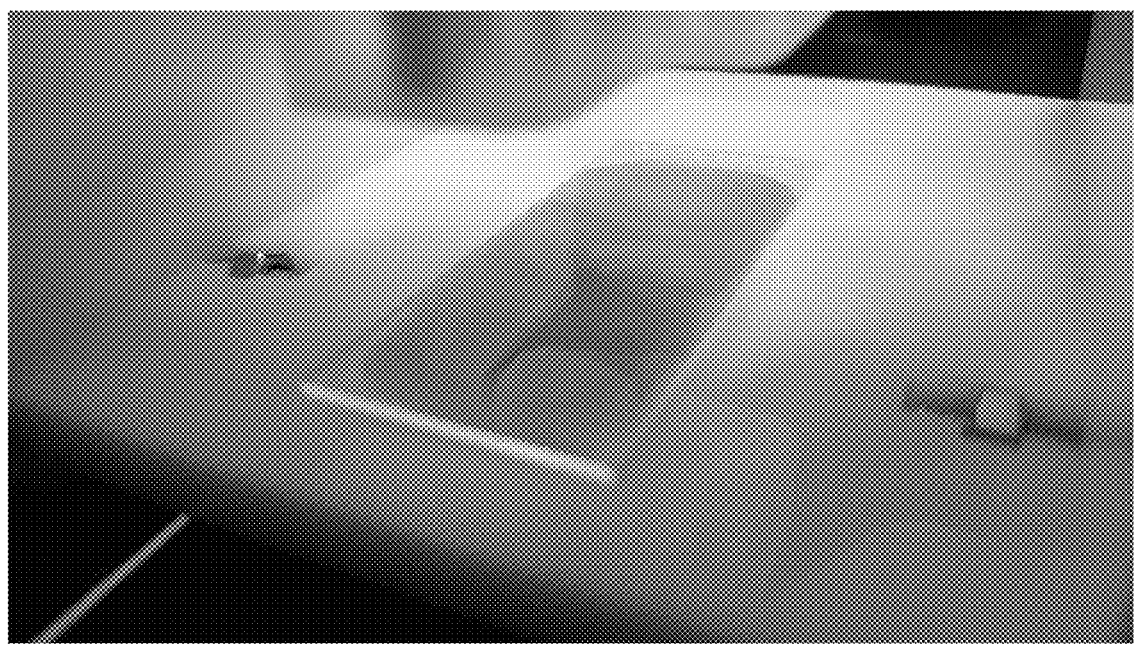
FIG. 11B illustrates the mixing of a dye within a fluid, the dye being substantially uniformly distributed within the fluid after operation of the contactless mixture.

A nozzle array (see FIG. 11A) was developed to enable mixing in two deliberate stages. During a first stage, the entire slide would be mixed in a single swirl; and then during a second stage, the slide would be divided into three swirls for "cross mixing" the results of the single swirl. This array also illustrated the idea for whole slide and cross mixing. FIG. 11B illustrates the result of a dye being mixed with a fluid (e.g. a reaction buffer) after operation of the contactless mixer.

Example 3—Methods of Pulsing

The nozzle arrays of a contactless mixer (e.g. the contactless mixer of FIG. 10A or 11A) were pulsed using a high speed (2 ms response time) valve and a function generator using a modulation technique called "pulse width modulation" (PWM), for a set frequency and during each period, the amount of "on time" vs. "off time" is varied. That ratio is referred to as duty cycle. So, 20% duty cycle at any frequency means it is "on" 20% of the time, off 80% of the time. The frequency only determines how often it switches on vs. off. For example, at 1 Hz, 80% duty cycle—the valve would turn on for 800 ms, off for 200 ms and repeat indefinitely. At 50% duty cycle and 1 Hz it would be on 500 ms, off 500 ms. Either way the period is independent of duty cycle at 1000 ms and the proportion of "on" vs. "off" time is what represents the duty cycle. So, for example at 20% duty cycle and 10 Hz, the valve would turn on 20 ms, off 80 ms and repeat (100 ms period).

At 20% duty cycle, increasing the frequency to 8 or 16 Hz "evens out" the small pulses so they produce smaller waves (less agitation) and the short duty cycle of 20% means it simply is not emitting much air. As the PWM frequency increases, it approaches similarity to a basic (non-PWM) air stream with 20% less air supply. At 50% duty cycle and any frequency the results are generally less impressive than at 20 or 80% duty cycle. 50% seems to be low enough to significantly reduce overall air flow, but not low enough to enable standing-wave agitation and not high enough to provide good bulk fluid movement.

At 80% duty cycle and any frequency the mixing is usually better than 20 or 50%. 80% duty cycle and 4 Hz activation frequency sometimes provides a combination of agitation and bulk fluid movement, but at 16 Hz the mixing is usually the best on almost all nozzles.

Based on these tests, it is believed that it would seem that bulk fluid movement allows sufficient mixing across the entire slide—far more important than localized agitation— and a steady, non-PWM nozzle will provide the most bulk fluid movement.

Additional Embodiments and/or Components

In one aspect of the present disclosure is an automated slide processing apparatus comprising: (a) at least one fluid dispenser configured to dispense a fluid onto an upper surface of a specimen-bearing slide; and (b) at least one contactless mixer for mixing fluid present on the upper surface of the slide, where the contactless mixer includes a first nozzle set and a second nozzle set, the first nozzle set configured to impart a first motion to the fluid present on the upper surface of the slide, and the second nozzle set configured to impart a second motion to at least a portion of fluid present on the upper surface of the slide (e.g. including, but not limited to, a portion of the fluid in which a first motion was induced). In some embodiments, the second motion induces cross-mixing of the fluid. In some embodiments, the first set of nozzles are operated independently and at different times from the second set of nozzles, i.e. the first set of nozzles are operated exclusive from the second set of nozzles. In some embodiments, the automated slide processing apparatus includes a second contactless mixer. In some embodiments, the first motion clockwise or counter-clockwise. In some embodiments, the second motion is the other of clockwise or counter-clockwise.

In another aspect of the present disclosure is an automated slide processing apparatus comprising: (i) a contactless mixer for mixing fluid present on the upper surface of the slide, where the contactless mixer includes a first nozzle array and a second nozzle array, the first nozzle array adapted to impart a bulk fluid flow to the fluid present on the upper surface of the slide, and the second nozzle array adapted to impart at least a first regional fluid flow to at least a portion of the fluid present on the upper surface of the slide. In some embodiments, the first regional fluid flow induces a cross-mixing within the fluid. In some embodiments, the automated slide processing apparatus is a staining apparatus, and wherein the fluid present on the upper surface of the slides includes a reagent, non-limiting examples of which include a staining reagent, a counterstaining reagent, or a wash reagent.

As noted herein, the automated slide processing apparatus may be tied to an imaging system. In some embodiments, the imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. For example, the control system may comprise computer hardware and/or software, including any of the components noted herein. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

Additional Embodiments

Additional Embodiment 1

An automated slide processing apparatus comprising: at least one fluid dispenser configured to dispense a fluid onto an upper surface of a specimen-bearing slide; and a contactless mixer for mixing fluid present on the upper surface of the slide, where the contactless mixer comprises a first nozzle set and a second nozzle set, the first nozzle set adapted to impart a first motion to the fluid present on the upper surface of the slide, and the second nozzle set adapted to impart at least a second motion to at least a portion of the fluid present on the upper surface of the slide, wherein the at least the second motion enables cross-mixing of the fluid.

Additional Embodiment 2

The automated slide processing apparatus of additional embodiment 1, wherein the first motion is one of a clockwise or counter-clockwise stirring.

Additional Embodiment 3

The automated slide processing apparatus of any of the preceding additional embodiments, wherein the second motion is the other of the clockwise or counter-clockwise stirring.

Additional Embodiment 4

The automated slide processing apparatus of additional embodiment 3, wherein the second motion is imparted to a center portion of the fluid.

Additional Embodiment 5

The automated slide processing apparatus of additional embodiment 4, wherein the second nozzle set is further adapted to impart a third motion to two end portions of the fluid, the two end portions of the fluid each adjacent to the center portion, and wherein the third motion is opposite the second motion.

Additional Embodiment 6

The automated slide processing apparatus of additional embodiment 5, wherein the first motion is a counter-clockwise stirring, the second motion is a clockwise stirring, and the third motion is a counter-clockwise stirring.

Additional Embodiment 7

The automated slide processing apparatus of additional embodiment 3, wherein the second motion is imparted to at least two portions of the fluid.

Additional Embodiment 8

The automated slide processing apparatus of additional embodiment 7, wherein the second nozzle set is further adapted to impart a third motion to a center portion of the fluid.

Additional Embodiment 9

The automated slide processing apparatus of additional embodiment 8, wherein the first motion is a counter-clockwise motion, the second motion is a clockwise motion, and the third motion is a counter-clockwise motion; and wherein the second motion is imparted to two end portions of fluid located on either side of the center portion.

Additional Embodiment 10

The automated slide processing apparatus of any of the preceding additional embodiments, wherein the contactless mixer is positioned above the upper surface of the slide.

Additional Embodiment 11

The automated slide processing apparatus of additional embodiment 2, wherein the contactless mixer is positioned substantially parallel to the upper surface of the slide.

Additional Embodiment 12

The automated slide processing apparatus of any of the preceding additional embodiments, wherein the first and second nozzle sets are configured to direct streams of gas to predetermined positions on the upper surface of the slide.

Additional Embodiment 13

The automated slide processing apparatus of any of the preceding additional embodiments, wherein the first nozzle set comprises between 2 and 6 nozzles.

Additional Embodiment 14

The automated slide processing apparatus of additional embodiment 1, wherein the second nozzle set comprises between 2 and 4 nozzles.

Additional Embodiment 15

The automated slide processing apparatus of additional embodiment 5, wherein the nozzles of the first nozzle set are grouped in two parallel rows along the longitudinal axis of the contactless mixer.

Additional Embodiment 16

The automated slide processing apparatus of additional embodiment 5, wherein the nozzles of the second nozzle set are grouped in two substantially parallel rows along the longitudinal axis of the contactless mixer.

Additional Embodiment 17

The automated slide processing apparatus of any of the preceding additional embodiments, wherein the first motion is imparted to a majority of the fluid on the upper surface of the slide.

Additional Embodiment 18

The automated slide processing apparatus of additional embodiment 1, wherein the second motion is imparted to at least two discrete portions of the fluid present on the upper surface of the slide.

Additional Embodiment 19

The automated slide processing apparatus of additional embodiment 1, wherein the second motion is imparted to at least three discrete portions of the fluid present on the upper surface of the slide.

Additional Embodiment 20

The automated slide processing apparatus of additional embodiment 1, wherein the first motion is one of a clockwise or a counterclockwise motion; and wherein the second motion is opposite the first motion.

Additional Embodiment 21

The automated slide processing apparatus of any of the preceding additional embodiments, wherein the automated slide processing apparatus is a staining apparatus, and wherein the fluid present on the upper surface of the slides comprises a reagent selected from the group consisting of a staining reagent, a counterstaining reagent, or a wash reagent.

Additional Embodiment 22

The automated slide processing apparatus of any of the preceding additional embodiments, further comprising a control system, the control system adapted to independently operate the first and second nozzle sets to impart the first and second motions.

Additional Embodiment 23

The automated slide processing apparatus of additional embodiment 22, wherein the control system includes one or more sensors for monitoring a surface tension, a volume of the at least one fluid, a temperature of the at least one fluid, or mechanical properties of the at least one fluid on a microscope slide.

Additional Embodiment 24

The automated slide processing apparatus of any of additional embodiments 22 and 23, wherein the control system includes one or more sensors for monitoring streams of gas emanating from the first and second sets of nozzles.

Additional Embodiment 25

The automated slide processing apparatus of any of additional embodiments 22 to 24, wherein the control system includes one or more feedback mechanisms to monitor mixing.

Additional Embodiment 26

The automate slide processing apparatus of any of additional embodiments 22 to 25, wherein the control system is adapted to dynamically adjust actuators, values, and/or solenoids to control a gas flow.

Additional Embodiment 27

The automated slide processing apparatus of any of the preceding additional embodiments, further comprising a third nozzle set to impart an additional motion to the fluid present on the upper surface of the slide.

Additional Embodiment 28

An automated slide processing apparatus comprising: at least one fluid dispenser configured to dispense a fluid onto an upper surface of a specimen-bearing slide; and a contactless mixer for mixing the fluid present on the upper surface of the slide, where the contactless mixer comprises a first nozzle array and a second nozzle array, the first nozzle array adapted to impart a bulk fluid flow to the fluid present on the upper surface of the slide, and the second nozzle array adapted to impart at least a first regional fluid flow to at least a portion of the fluid present on the upper surface of the slide.

Additional Embodiment 29

The automated slide processing apparatus of additional embodiment 28, wherein the bulk fluid flow is in a clockwise or counter-clockwise direction.

Additional Embodiment 30

The automated slide processing apparatus of additional embodiment 28 or 29, wherein the first regional fluid flow is the other of the clockwise or counter-clockwise direction.

Additional Embodiment 31

The automated slide processing apparatus of additional embodiment 30, wherein the first regional fluid flow is imparted to a center portion of the fluid present on the upper surface of the slide.

Additional Embodiment 32

The automated slide processing apparatus of additional embodiment 31, wherein the second nozzle array is further adapted to impart a second regional fluid flow and a third regional fluid flow, the second and third regional fluid flows occurring at two different end portions of the fluid on the slide, the two end portions each being adjacent to the center portion, and wherein the second and third regional fluid flows are opposite the first regional fluid flow.

Additional Embodiment 33

The automated slide processing apparatus of any of additional embodiments 28 to 32, wherein the automated slide processing apparatus is a staining apparatus, and wherein the fluid present on the upper surface of the slides comprises a reagent selected from the group consisting of a staining reagent, a counterstaining reagent, or a wash reagent.

Additional Embodiment 34

An automated slide processing apparatus comprising: at least one fluid dispenser configured to dispense a fluid onto an upper surface of a specimen-bearing slide; and a contactless mixer for distributing fluid present on the upper surface of the slide, where the contactless mixer includes a first nozzle array in fluidic communication with a first plenum, wherein the first nozzle array comprises a first set of primary nozzles directing a gas stream in a first direction and a second set of primary nozzles directing the gas stream in a second direction; and a second nozzle array in fluid communication with a second plenum, wherein the second nozzle array comprises a first set of secondary nozzles directing the gas stream in a third direction and a second set of secondary nozzles directing the gas stream in a fourth direction.

Additional Embodiment 35

The automated slide processing apparatus of additional embodiment 34, wherein the first and second directions are opposite each other.

Additional Embodiment 36

The automated slide processing apparatus of additional embodiment 35, wherein the gas streams emanating from the first and second sets of primary nozzles are directed substantially along a periphery of the fluid present on the upper surface of the slide.

Additional Embodiment 37

The automated slide processing apparatus of additional embodiment 35, wherein the gas stream emanating from the first set of primary nozzles is substantially along a first longitudinal axis of the slide; and wherein the gas stream emanating from the second set of primary nozzles is substantially along a second longitudinal axis of the slide.

Additional Embodiment 38

The automated slide processing apparatus of additional embodiment 37, wherein the gas streams from the first and second primary nozzles form an angle of incidence with the surface of the slide ranging from between about 5 degrees to about 90 degrees.

Additional Embodiment 39

The automated slide processing apparatus of additional embodiment 37, wherein the gas streams emanating from the first and second sets of primary nozzles are independently offset by up to +/−15 degrees relative to the longitudinal axis of the slide.

Additional Embodiment 40

The automated slide processing apparatus of additional embodiment 36, wherein the first nozzle array imparts a bulk fluid motion to the fluid present on the upper surface of the slide.

Additional Embodiment 41

The automated slide processing apparatus of additional embodiment 34, wherein each nozzle in the first set of secondary nozzles directs a gas stream to a different position on the upper surface of the slide; and wherein each nozzle in the second set of secondary nozzles directs a gas stream to a different position on the upper surface of the slide.

Additional Embodiment 42

The automated slide processing apparatus of additional embodiment 41, wherein the second nozzle array establishes at least two regional fluid flows.

Additional Embodiment 43

A method of processing a specimen-bearing slide comprising: (i) depositing a first reagent on the specimen-bearing slide; and (ii) uniformly distributing the deposited first reagent on the specimen-bearing slide, wherein the deposited first reagent is distributed by introducing a first set of pulsed gas jets to the deposited first reagent to effectuate a first fluid motion to a first portion of the deposited first reagent for a predetermined first period of time, and introducing a second set of pulsed gas jets to the deposited first reagent to effectuate at least a second fluid motion to at least a second portion of the deposited first reagent for a predetermined second period of time.

Additional Embodiment 44

The method of additional embodiment 43, wherein the first portion of the deposited first reagent comprises a majority of the deposited first reagent.

Additional Embodiment 45

The method of additional embodiment of additional embodiment 43 or 44, wherein the first fluid flow is a bulk fluid motion.

Additional Embodiment 46

The method of any of additional embodiments 43 to 45, wherein the at least the second portion of the deposited first reagent is a center portion of the deposited first reagent.

Additional Embodiment 47

The method of any of additional embodiments 43 to 46, wherein the first and second motions are in the same direction.

Additional Embodiment 48

The method of any of additional embodiments 43 to 46, wherein the first and second motions are in opposite directions.

Additional Embodiment 49

The method of any of additional embodiments 43 to 46, wherein a total period of time for pulsing the first ranges from about 4 seconds to about 120 seconds.

Additional Embodiment 50

The method of any of additional embodiments 43 to 46, wherein the first predetermined time period ranges from about 2 seconds to about 10 seconds.

Additional Embodiment 51

The method of any of additional embodiments 43 to 46, wherein the second predetermined time period ranges from about 2 seconds to about 10 seconds.

Additional Embodiment 52

The method of any of additional embodiments 43 to 46, wherein the first set of gas jets and the second set of gas jets are sequentially operated at least 2 times each.

Additional Embodiment 53

The method of any of additional embodiments 43 to 46, wherein pulsing with either the first or second sets of gas jets occurs at a frequency ranging from about 4 Hz to about 20 Hz.

The invention claimed is:
1. An automated slide processing apparatus comprising:
at least one fluid dispenser configured to dispense a fluid onto an upper surface of a specimen-bearing slide; and
a contactless mixer for distributing the fluid present on the upper surface of the slide, where the contactless mixer includes a first nozzle array in fluidic communication with a first plenum, wherein the first nozzle array comprises a first set of primary nozzles directing a first gas stream in a first direction and a second set of primary nozzles directing a second gas stream in a second direction; and a second nozzle array in fluid communication with a second plenum, wherein the second nozzle array comprises a first set of secondary nozzles directing a third gas stream in a third direction and a second set of secondary nozzles directing a fourth gas stream in a fourth direction, wherein the first and second directions are opposite each other and wherein the gas streams emanating from the first and second sets of primary nozzles are directed substantially along a periphery of the fluid present on the upper surface of the slide.

2. The automated slide processing apparatus of claim 1, wherein the first nozzle array comprises between 2 and 6 nozzles and wherein the second nozzle array comprises between 2 and 4 nozzles.

3. The automated slide processing apparatus of claim 1, further comprising a control system, the control system adapted to independently operate the first and second nozzle arrays.

4. The automated slide processing apparatus of claim 1, wherein the gas streams emanating from the first and second sets of primary nozzles form an angle of incidence with the surface of the slide ranging from between about 20 degrees to about 60 degrees.

5. The automated slide processing apparatus of claim 4, wherein the angle of incidence ranges from between about 25 degrees to about 55 degrees.

6. The automated slide processing apparatus of claim 1, wherein the third and fourth directions are opposite each other.

7. The automated slide processing apparatus of claim 1, wherein the gas streams emanating from the first and second sets of primary nozzles are independently offset by up to +/−15 degrees relative to the longitudinal axis of the slide.

8. The automated slide processing apparatus of claim 1, wherein the first nozzle array imparts a bulk fluid motion to the fluid present on the upper surface of the slide.

9. The automated slide processing apparatus of claim 1, wherein the first and second gas streams are directed to different positions on the upper surface of the slide; and wherein each nozzle in the second set of secondary nozzles directs the fourth gas stream to a different position on the upper surface of the slide.

10. The automated slide processing apparatus of claim 1, wherein the second nozzle array comprise a third set of secondary nozzles directing a fifth gas stream in a fifth direction.

11. The automates slide processing apparatus of claim 10, wherein the third and fifth directions are the same, and wherein the fourth direction is different from the third and fifth directions.

12. The automated slide processing apparatus of claim 1, wherein the contactless mixer is positioned above and substantially parallel to the upper surface of the slide.

13. The automated slide processing apparatus of claim 1, wherein the nozzles of the first nozzle array are grouped in two parallel rows along the longitudinal axis of the contactless mixer.

14. The automated slide processing apparatus of claim 1, wherein the nozzles of the second nozzle array are grouped in two substantially parallel rows along the longitudinal axis of the contactless mixer.

* * * * *